United States Patent
Kubo

(10) Patent No.: US 12,071,542 B2
(45) Date of Patent: Aug. 27, 2024

(54) LIGHT-ABSORBING COMPOSITION AND OPTICAL FILTER

(71) Applicant: Nippon Sheet Glass Company, Limited, Tokyo (JP)

(72) Inventor: Yuichiro Kubo, Tokyo (JP)

(73) Assignee: NIPPON SHEET GLASS COMPANY, LIMITED, Tokyo (JP)

( * ) Notice: Subject to any disclaimer, the term of this patent is extended or adjusted under 35 U.S.C. 154(b) by 649 days.

(21) Appl. No.: 16/762,053

(22) PCT Filed: Oct. 15, 2018

(86) PCT No.: PCT/JP2018/038361
§ 371 (c)(1),
(2) Date: May 6, 2020

(87) PCT Pub. No.: WO2019/093076
PCT Pub. Date: May 16, 2019

(65) Prior Publication Data
US 2020/0270455 A1    Aug. 27, 2020

(30) Foreign Application Priority Data

Nov. 7, 2017 (JP) .................................. 2017-214735

(51) Int. Cl.
*C08L 83/04* (2006.01)
*C08K 5/5317* (2006.01)
(Continued)

(52) U.S. Cl.
CPC ............ *C08L 83/04* (2013.01); *C08K 5/5317* (2013.01); *C08K 5/56* (2013.01); *G02B 5/22* (2013.01)

(58) Field of Classification Search
CPC ......... C08L 83/04; C08K 5/56; C08K 5/5317; G02B 5/22
See application file for complete search history.

(56) References Cited

U.S. PATENT DOCUMENTS

| 7,025,908 B1 | 4/2006 | Hayashi et al. |
| 11,550,086 B2 | 1/2023 | Takagi et al. |
(Continued)

FOREIGN PATENT DOCUMENTS

| CN | 107111026 | 8/2017 |
| JP | 2000310948 | 11/2000 |
(Continued)

OTHER PUBLICATIONS

International Search Report and Written Opinion issued for International Patent Application No. PCT/JP2018/038361, Date of mailing: Jan. 8, 2019, 9 pages including English translation of Search Report.
(Continued)

*Primary Examiner* — Bijan Ahvazi
(74) *Attorney, Agent, or Firm* — HSML P.C.

(57) ABSTRACT

A light-absorbing composition according to the present invention contains a light absorber formed by a particular phosphonic acid and copper ion and an alkoxysilane monomer for dispersing the light absorber, and does not contain a phosphoric acid ester having a polyoxyalkyl group. The light-absorbing composition contains the alkoxysilane monomer in such a manner that a normalized transmittance spectrum has a wavelength band in which the spectral transmittance is 70% or more in a wavelength range from 300 nm to 700 nm and the difference between the maximum value and the minimum value of the wavelength in the wavelength band is 100 nm or more.

10 Claims, 10 Drawing Sheets

(51) Int. Cl.
  *C08K 5/56* (2006.01)
  *G02B 5/22* (2006.01)

(56) References Cited

U.S. PATENT DOCUMENTS

| | | |
|---|---|---|
| 2002/0186310 A1 | 12/2002 | Kitagishi |
| 2012/0243077 A1 | 9/2012 | Osawa et al. |
| 2014/0063597 A1 | 3/2014 | Shimmo et al. |
| 2014/0300956 A1 | 10/2014 | Kubo et al. |
| 2015/0146057 A1 | 5/2015 | Konishi et al. |
| 2016/0326043 A1 | 11/2016 | Sun |
| 2017/0146708 A1 | 5/2017 | Lah |
| 2017/0227690 A1 | 8/2017 | Sasaki et al. |
| 2018/0003872 A1 | 1/2018 | Kubo et al. |
| 2018/0095203 A1 | 4/2018 | Ooi et al. |
| 2018/0188428 A1 | 7/2018 | Arimura et al. |
| 2018/0275326 A1 | 9/2018 | Kubo et al. |
| 2018/0282521 A1 | 10/2018 | Kubo et al. |
| 2020/0386928 A1* | 12/2020 | Takagi ............... G02B 5/223 |

FOREIGN PATENT DOCUMENTS

| | | |
|---|---|---|
| JP | 2001154015 | 6/2001 |
| JP | 2002281515 A | 9/2002 |
| JP | 2009242650 | 10/2009 |
| JP | 2009242650 A * | 10/2009 ....... B32B 17/10174 |
| JP | 2011159800 A | 8/2011 |
| JP | 2011203467 | 10/2011 |
| JP | 2012103340 A | 5/2012 |
| JP | 2012185385 | 9/2012 |
| JP | 2014052482 A | 3/2014 |
| JP | 2014203044 A | 10/2014 |
| JP | 2016124903 | 7/2016 |
| JP | 2017146506 A | 8/2017 |
| JP | 6232161 B1 | 11/2017 |
| WO | 2009123016 | 10/2009 |
| WO | 2014030628 A1 | 2/2014 |
| WO | 2017006571 | 1/2017 |
| WO | 2017051512 A1 | 3/2017 |
| WO | 2017051867 A1 | 3/2017 |
| WO | 2017056803 A1 | 4/2017 |
| WO | 2017126528 | 7/2017 |
| WO | 2017183671 | 10/2017 |

OTHER PUBLICATIONS

International Search Report and Written Opinion issued for International Patent Application No. PCT/JP2018/041868, Date of mailing: Feb. 5, 2019, 9 pages including English translation of Search Report.

* cited by examiner

LIGHT-ABSORBING COMPOSITION AND OPTICAL FILTER

TECHNICAL FIELD

The present invention relates to a light-absorbing composition and an optical filter.

BACKGROUND ART

In imaging apparatuses employing a solid-state imaging sensor such as a charge coupled device (CCD) or a complementary metal oxide semiconductor (CMOS), any of various optical filters is disposed ahead of the solid-state imaging sensor in order to obtain an image with good color reproduction. Solid-state imaging sensors generally have spectral sensitivity over a wide wavelength range from the ultraviolet to infrared regions. The visual sensitivity of humans lies solely in the visible region. Thus, a technique is known in which an optical filter that blocks infrared light or ultraviolet light is disposed ahead of a solid-state imaging sensor in an imaging apparatus in order to allow the spectral sensitivity of the solid-state imaging sensor to approximate to the visual sensitivity of humans.

Such an optical filter is largely classified into an optical filter utilizing light reflection by a dielectric multilayer film or an optical filter having a layer containing a light absorber. From the viewpoint of reducing the dependence of the optical properties of an optical filter on the incident angle of light, the latter optical filter is advantageous.

For example, Patent Literature 1 describes a near-infrared cut filter formed of a near-infrared absorber and a resin. The near-infrared absorber is obtained from a particular phosphonic acid compound, a particular phosphoric acid ester compound, and a copper salt. The particular phosphonic acid compound has a monovalent group $R^1$ represented by —$CH_2CH_2$—$R^{11}$, which is bound to a phosphorus atom P. $R^{11}$ represents a hydrogen atom, an alkyl group having 1 to 20 carbon atoms, or a fluorinated alkyl group having 1 to 20 carbon atoms. The particular phosphoric acid ester compound has a monovalent group (polyoxyalkyl group) represented by —$(CH_2CH_2O)_nR^5$, which is bound to the phosphorus atom P via an oxygen atom. $R^5$ is an alkyl group having 6 to 25 carbon atoms or an alkylphenyl group having 6 to 25 carbon atoms. It is considered that, according to Patent Literature 1, copper phosphonate obtained through a reaction of the particular phosphoric acid ester compound and the copper salt is maintained in an extremely fine state owing to the action of the particular phosphonic acid ester compound.

CITATION LIST

Patent Literature

Patent Literature 1: JP 2011-203467 A

SUMMARY OF INVENTION

Technical Problem

The technique described in Patent Literature 1 requires the phosphoric acid ester compound having a polyoxyalkyl group in order to maintain the copper phosphonate in an extremely fine state in the near-infrared absorber.

In light of the foregoing, it is an object of the present invention to provide a light-absorbing composition that allows a light absorber formed by a phosphonic acid and copper ion to be dispersed therein even though the light-absorbing composition does not contain a phosphoric acid ester compound having a polyoxyalkyl group and is advantageous in imparting desired optical properties to an optical filter. The present invention also provides an optical filter that can exhibit desired optical properties even though it does not contain a phosphoric acid ester compound having a polyoxyalkyl group.

Solution to Problem

The present invention provides a light-absorbing composition including:
 a light absorber formed by a phosphonic acid represented by the following formula (a) and copper ion; and
 an alkoxysilane monomer for dispersing the light absorber, wherein
 the light-absorbing composition does not contain a phosphoric acid ester having a polyoxyalkyl group,
 the light-absorbing composition contains the alkoxysilane monomer in such a manner that a normalized transmittance spectrum has a wavelength band in which a spectral transmittance is 70% or more in a wavelength range from 300 nm to 700 nm and a difference between a maximum value and a minimum value among wavelengths in the wavelength band is 100 nm or more, and
 the normalized transmittance spectrum is obtained by normalizing a transmittance spectrum such that a spectral transmittance at a wavelength of 700 nm is 20%, the transmittance spectrum being obtained when light having a wavelength from 300 nm to 1200 nm is perpendicularly incident on a light-absorbing layer that is formed by subjecting a film formed of the light-absorbing composition to a drying treatment and a humidifying treatment:

(a)

where $R_{11}$ is an alkyl group, an aryl group, a nitroaryl group, a hydroxyaryl group, or a halogenated aryl group in which at least one hydrogen atom in an aryl group is substituted by a halogen atom.

The present invention also provides an optical filter including:
 a light absorbing layer that contains a light absorber formed by a phosphonic acid represented by the following formula (a) and copper ion and a hydrolysis-polycondensation product of an alkoxysilane monomer and does not contain a phosphoric acid ester having a polyoxyalkyl group, wherein
 a normalized transmittance spectrum has a first wavelength band in which a spectral transmittance is 70% or more in a wavelength range from 300 nm to 700 nm and a difference between a maximum value and a minimum value among wavelengths in the first wavelength band is 100 nm or more, and
 the normalized transmittance spectrum is obtained by normalizing a transmittance spectrum such that a spectral transmittance at a wavelength of 700 nm is 20%, the transmittance spectrum being obtained when light having a wavelength from 300 nm to 1200 nm is perpendicularly incident on the optical filter:

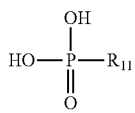

(a)

where $R_{11}$ is an alkyl group, an aryl group, a nitroaryl group, a hydroxyaryl group, or a halogenated aryl group in which at least one hydrogen atom in an aryl group is substituted by a halogen atom.

Advantageous Effects of Invention

The above light-absorbing composition allows a light absorber formed by a phosphonic acid and copper ion to be dispersed therein even though the light-absorbing composition does not contain a phosphoric acid ester compound having a polyoxyalkyl group, and is advantageous in imparting desired optical properties to an optical filter. The above optical filter can exhibit desired optical properties even though it does not contain a phosphoric acid ester compound having a polyoxyalkyl group.

DESCRIPTION OF EMBODIMENTS

Figure 1:
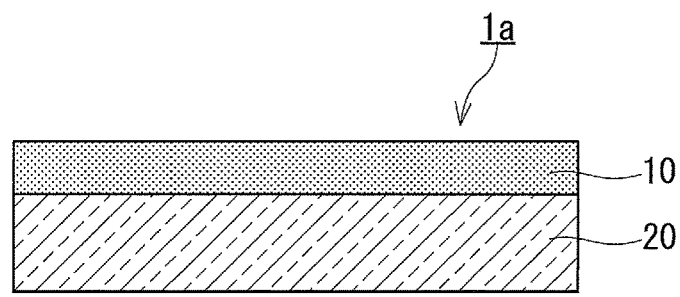
FIG. 1 is a cross-sectional view showing an example of the optical filter of the present invention.

The inventor of the present invention considered that the phosphoric acid ester used in the technique described in Patent Literature 1 is not an optimum material in terms of weather resistance because the phosphoric acid ester has a polyoxyalkyl group and thus is hydrolyzed easily when exposed to water. In the technique described in Patent Literature 1, if a sufficient amount of resin is present with the near-infrared absorber, the weather resistance of the near-infrared cut filter is expected to reach a satisfactory level. This, however, requires a relatively large amount of resin. On this account, the inventor also considered that the near-infrared cut filter according to the technique disclosed in Patent Literature 1 tends to have a large thickness. In light of the foregoing, the inventor conducted in-depth studies to find a novel material suitable for dispersing a light absorber formed by a particular phosphonic acid and copper ion. As a result, the inventor newly found that proper dispersion of a light absorber can be achieved using an alkoxysilane monomer, without using a phosphoric acid ester having a polyoxyalkyl group. On the basis of this new finding, the inventor developed the light-absorbing composition and the optical filter according to the present invention.

Hereinafter, embodiments of the present invention will be described with reference to the drawings. The following description is directed to some examples of the present invention, and the present invention is not limited by these examples.

The light-absorbing composition according to the present invention contains a light absorber and an alkoxysilane monomer. The light absorber is formed of a phosphonic acid represented by the following formula (a) and copper ion. The alkoxysilane monomer disperses the light absorber. In addition, the light-absorbing composition does not contain a phosphoric acid ester having a polyoxyalkyl group. The light-absorbing composition contains the alkoxysilane monomer in such a manner that a normalized transmittance spectrum has a wavelength band in which the spectral transmittance is 70% or more in a wavelength range from 300 nm to 700 nm and the difference between the maximum value and the minimum value among wavelengths in this wavelength band is 100 nm or more. In other words, the type and the amount of the alkoxysilane monomer in the light-absorbing composition are determined in such a manner that the normalized transmittance spectrum has a wavelength band in which the spectral transmittance is 70% or more in a wavelength range from 300 nm to 700 nm and the difference between the maximum value and the minimum value of the wavelength in this wavelength band is 100 nm or more. With this configuration, an optical filter produced using the light-absorbing composition is likely to have desired optical properties. The normalized transmittance spectrum is obtained by normalizing a transmittance spectrum such that a spectral transmittance at a wavelength of 700 nm is 20%. The transmittance spectrum is obtained when light having a wavelength from 300 nm to 1200 nm is perpendicularly incident on a light-absorbing layer that is formed by subjecting a film formed of this light-absorbing composition to a drying treatment and a humidifying treatment.

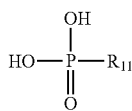
(a)

In the formula, $R_{11}$ is an alkyl group, an aryl group, a nitroaryl group, a hydroxyaryl group, or a halogenated aryl group in which at least one hydrogen atom in an aryl group is substituted by a halogen atom.

Although the light-absorbing composition does not contain a phosphoric acid ester having a polyoxyalkyl group, the light absorber is properly dispersed in the light-absorbing composition owing to the action of the alkoxysilane monomer. Further, the light-absorbing composition can be used to produce an optical filter. In this case, a hydrolysis reaction and a polycondensation reaction of the alkoxysilane monomer contained in the light-absorbing composition occur, whereby a siloxane bond (—Si—O—Si—) is formed. In other words, a hydrolysis-polycondensation product of the alkoxysilane monomer is produced. A particular functional group of the hydrolysis-polycondensation product of the alkoxysilane monomer enters between fine particles of the light absorber to cause steric hindrance, thereby preventing aggregation of the light absorber. Accordingly, the light-absorbing composition according to the present invention can impart desired optical properties to an optical filter even though it does not contain a phosphoric acid ester compound having a polyoxyalkyl group.

Examples of the phosphoric acid ester having a polyoxyalkyl group include, but not particularly limited to, PLYSURF A208N (polyoxyethylene alkyl (C12, C13) ether phosphoric acid ester), PLYSURF A208F (polyoxyethylene alkyl (C8) ether phosphoric acid ester), PLYSURF A208B (polyoxyethylene lauryl ether phosphoric acid ester), PLYSURF A219B (polyoxyethylene lauryl ether phosphoric acid ester), PLYSURF AL (polyoxyethylene styrenated phenylether phosphoric acid ester), PLYSURF A212C (polyoxyethylene tridecyl ether phosphoric acid ester), and PLYSURF A215C (polyoxyethylene tridecyl ether phosphoric acid ester). They are all products manufactured by DKS Co., Ltd. The phosphoric acid ester may be NIKKOL DDP-2 (polyoxyethylene alkyl ether phosphoric acid ester), NIKKOL DDP-4 (polyoxyethylene alkyl ether phosphoric acid ester), or NIKKOL DDP-6 (polyoxyethylene alkyl ether phosphoric acid ester). They are all products manufactured by Nikko Chemicals Co., Ltd.

Desirably, the light-absorbing composition is substantially free of; (i) any other compound that has a polyoxyethylene alkyl group; (ii) a compound that has a sulfonate group or a sulfate ester group and exhibits an action advantageous in dispersing the light absorber when the compound is added; and (iii) a compound that contains an amine salt or a quaternary ammonium salt. The light-absorbing composition can prevent aggregation of the light absorber even though it does not contain such compounds.

The alkoxysilane monomer desirably includes an alkyl group-containing alkoxysilane monomer represented by the following formula (b). In this case, during the production of a hydrolysis-polycondensation product of the alkoxysilane monomer, an alkyl group of the alkyl group-containing alkoxysilane monomer enters between fine particles of the light absorber, whereby aggregation of the light absorber can be prevented more reliably.

$(R_2)_n$—Si—$(OR_3)_{4-n}$ (b)

In the formula, $R_2$ is an alkyl group having 1 to 4 carbon atoms, $R_3$ is an alkyl group having 1 to 8 carbon atoms, and n is an integer of 1 to 3.

The alkoxysilane monomer is not particularly limited as long as the normalized transmission spectrum satisfies the above conditions, and examples thereof include tetramethoxysilane, tetraethoxysilane, methyltrimethoxysilane, methyltriethoxysilane, dimethyldiethoxysilane, dimethyldimethoxysilane, phenyltrimethoxysilane, phenyltriethoxysilane, 3-glycidoxypropyltrimethoxysilane, 3-glycidoxypropyltriethoxysilane, and 3-glycidoxypropylmethyldiethoxysilane.

The phosphonic acid represented by the formula (a) is not particularly limited. When the phosphonic acid is a phosphonic acid (alkyl-based phosphonic acid) represented by the formula (a) in which $R_{11}$ is an alkyl group, the phosphonic acid is, for example, a phosphonic acid in which the alkyl group has 1 to 8 carbon atoms. When the phosphonic acid is a phosphonic acid (aryl-based phosphonic acid) represented by the formula (a) in which $R_{11}$ is an aryl group, a nitroaryl group, a hydroxyaryl group, or a halogenated aryl group, the phosphonic acid represented by the formula (a) is, for example, phenylphosphonic acid, nitrophenylphosphonic acid, hydroxyphenylphosphonic acid, bromophenylphosphonic acid, dibromophenylphosphonic acid, fluorophenylphosphonic acid, difluorophenylphosphonic acid, chlorophenylphosphonic acid, dichlorophenylphosphonic acid, benzylphosphonic acid, bromobenzylphosphonic acid, dibromobenzylphosphonic acid, fluorobenzylphosphonic acid, difluorobenzylphosphonic acid, chlorobenzylphosphonic acid, or dichlorobenzylphosphonic acid.

The source of copper ion in the light-absorbing composition is, for example, a copper salt. The copper salt is, for example, copper acetate or a hydrate of copper acetate. The copper salt may be an anhydride or a hydrate of copper chloride, copper formate, copper stearate, copper benzoate, copper pyrophosphate, copper naphthenate, or copper citrate. For example, copper acetate monohydrate is represented by $Cu(CH_3COO)_2 \cdot H_2O$, and 1 mol of copper acetate monohydrate supplies 1 mol of copper ion.

The relationship among the content of the phosphonic acid, the content of the copper ion, and the content of the alkoxysilane monomer in the light-absorbing composition is not particularly limited as long as the normalized transmittance spectrum satisfies the above conditions. For example, the ratio of the content of the alkoxysilane monomer to the content of the copper ion is 2.0 or more, desirably 2.5 or more, on an amount-of-substance basis. Further, the ratio of the content of the alkyl group-containing alkoxysilane monomer represented by the formula (b) where n=1 or 2 to the content of the copper ion is, for example, 1.5 or more on an amount-of-substance basis.

For example, when the following conditions (α1) and (β1) are satisfied, the ratio of the content of the alkyl group-containing alkoxysilane monomer represented by the formula (b) where n=1 or 2 to the content of the copper ion is 2.5 or more on an amount-of-substance basis. In this case, an optical filter produced using the light-absorbing composition is likely to have desired optical properties.

(α1) The phosphonic acid includes a phosphonic acid represented by the formula (a) where $R_{11}$ is an aryl group, a nitroaryl group, a hydroxyaryl group, or a halogenated aryl group in which at least one hydrogen atom in an aryl group is substituted by a halogen atom.

(β1) The alkoxysilane monomer includes an alkyl group-containing alkoxysilane monomer represented by the formula (b) where n=1 or 2 and a tetrafunctional alkoxysilane monomer represented by the formula (c).

$$\text{Si}-(\text{OR}_4)_4 \quad (c)$$

In the formula, $R_4$ is an alkyl group having 1 to 8 carbon atoms.

When the following conditions (α2) and (β2) are satisfied, for example, the ratio of the content of the alkyl group-containing alkoxysilane monomer represented by the formula (b) where n=1 or 2 to the content of the copper ion is 3.0 or more on an amount-of-substance basis. In this case, an optical filter produced using the light-absorbing composition is likely to have desired optical properties.

(α2) The phosphonic acid includes a phosphonic acid represented by the formula (a) where $R_{11}$ is an aryl group, a nitroaryl group, a hydroxyaryl group, or a halogenated aryl group in which at least one hydrogen atom in an aryl group is substituted by a halogen atom.

(β2) The alkoxysilane monomer includes an alkyl group-containing alkoxysilane monomer represented by the formula (b) where n=1 or 2 and does not include a tetrafunctional alkoxysilane monomer represented by the formula (c).

When the following conditions (α3) and (β3) are satisfied, for example, the ratio of the content of the alkyl group-containing alkoxysilane monomer represented by the formula (b) where n=1 or 2 to the content of the copper ion is 1.5 or more on an amount-of-substance basis. In this case, an optical filter produced using the light-absorbing composition is likely to have desired optical properties.

(α3) The phosphonic acid includes only a phosphonic acid represented by the the formula (a) where $R_{11}$ is an alkyl group.

(β3) The alkoxysilane monomer includes an alkyl group-containing alkoxysilane monomer represented by the formula (b) where n=1 or 2.

The light-absorbing composition may further contain a resin when necessary, or may be free of a resin in some cases. In the light-absorbing composition, the ratio of the solid content of the resin composition to the sum of the content of the phosphonic acid, the content of the copper ion, and the content of the alkoxysilane monomer as expressed in terms of the hydrolysis-polycondensation product is, for example, 0 to 3.0, desirably 0 to 2.7, on a mass basis. Since the light-absorbing composition requires a small amount of resin as described above, an optical filter produced using the light-absorbing composition is likely to have a small thickness.

When the light-absorbing composition further contains a resin, the resin is not limited to a particular resin as long as the normalized transmittance spectrum satisfies the above conditions, and may be, for example, a silicone resin. The silicone resin is a compound having a siloxane bond (—Si—O—Si—) in its structure. In this case, since the hydrolysis-polycondensation product of the alkoxysilane monomer also has a siloxane bond, the alkoxysilane monomer hydrolysis-polycondensation product derived from the alkoxysilane monomer is compatible with the resin in the optical filter.

The resin is desirably a silicone resin containing an aryl group such as a phenyl group. When the resin contained in the optical filter is excessively hard (rigid), the risk that a layer containing the resin may crack owing to cure shrinkage during the production process of the optical filter increases as the thickness of the layer increases. When the resin is a silicone resin containing an aryl group, the layer formed of the light-absorbing composition is likely to have high crack resistance. The silicone resin containing an aryl group has high compatibility with the phosphonic acid represented by the formula (a), and thus aggregation of the light absorber is unlikely to occur. Specific examples of the silicone resin used as a matrix resin include KR-255, KR-300, KR-2621-1, KR-211, KR-311, KR-216, KR-212, KR-251, and KR-5230. They are all silicone resins manufactured by Shin-Etsu Chemical Co., Ltd.

The light absorber in the light-absorbing composition is formed by, for example, coordination of the phosphonic acid represented by the formula (a) to the copper ion. For example, fine particles containing at least the light absorber are formed in the light-absorbing composition. In this case, as described above, owing to the action of the alkoxysilane monomer, the fine particles are dispersed in the light-absorbing composition without causing aggregation. The average particle diameter of the fine particles is, for example, 5 nm to 200 nm. When the average particle diameter of the fine particles is 5 nm or more, no particular ultramiconization process is required in order to obtain the fine particles, and the risk of structural destruction of the fine particles containing at least the light absorber is low. In addition, the fine particles are well dispersed in the light-absorbing composition. When the average particle diameter of the fine particles is 200 nm or less, it is possible to reduce the influence of Mie scattering, to increase the visible transmittance of an optical filter, and to prevent deterioration of the properties such as contrast and haze of an image captured by an imaging apparatus. Desirably, the average particle diameter of the fine particles is 100 nm or less. In this case, the influence of Rayleigh scattering is reduced, whereby an optical filter produced using the light-absorbing composition can have improved transparency to visible light. More desirably, the average particle diameter of the fine particles is 75 nm or less. In this case, an optical filter produced using the light-absorbing composition exhibits an especially high transparency to visible light. The average particle diameter of the fine particles can be measured by dynamic light scattering.

An example of a method for preparing the light-absorbing composition according to the present invention will be described. For example, when the light-absorbing composition contains a phosphonic acid (aryl-based phosphonic acid) represented by the formula (a) where $R_{11}$ is an aryl group, a nitroaryl group, a hydroxyaryl group, or an halogenated aryl group in which at least one hydrogen atom in an aryl group is substituted by a halogen atom, a solution D is prepared in the following manner. First, a copper salt such as copper acetate monohydrate is added to a given solvent such as tetrahydrofuran (THF), and the mixture is stirred to prepare a copper salt solution as a solution A. Next, an aryl-based phosphonic acid is added to a given solvent such as THF, and the mixture is stirred to prepare a solution B. When a plurality of aryl-based phosphonic acids are used as the phosphonic acids represented by the formula (a), the solution B may be prepared by adding the aryl-based phosphonic acids to given solvents such as THF, respectively, stirring the mixtures to prepare a plurality of preliminary solutions containing the respective aryl-based phosphonic acids, and then mixing the thus-prepared preliminary solutions together. For example, an alkoxysilane monomer is added in the preparation of the solution B. The solution B is added to the solution A while stirring the solution A, and the mixture is further stirred for a given period of time. To this solution is then added a given solvent such as toluene, and the mixture is stirred to obtain a solution C. Subsequently, the solution C is subjected to solvent removal for a given period of time under heating to obtain a solution D. Through this process, the solvent such as THF and the component such as acetic acid (boiling point: about 118° C.) generated by disassociation of the copper salt are removed, whereby a light absorber is generated by the phosphonic acid represented by the formula (a) and copper ion. The heating temperature of the solution C is determined on the basis of the boiling point of the to-be-removed component disassociated from the copper salt. During the solvent removal, the solvent such as toluene (boiling point: about 110° C.) used to obtain the solution C is also evaporated. A certain amount of this solvent desirably remains in the light-absorbing composition. This is preferably taken into account in determining the amount of the solvent to be added and the time period of the solvent removal. To obtain the solution C, o-xylene (boiling point: about 144° C.) may be used instead of toluene. In this case, the amount of o-xylene to be added may be about one-fourth of the amount of toluene to be added, because the boiling point of o-xylene is higher than that of toluene.

When the light-absorbing composition contains a phosphonic acid (alkyl-based phosphonic acid) represented by the formula (a) where $R_{11}$ is an alkyl group, a solution H is further prepared in the following manner, for example. First, a copper salt such as copper acetate monohydrate is added to a given solvent such as tetrahydrofuran (THF), and the mixture is stirred to obtain a copper salt solution as a solution E. Further, an alkyl-based phosphonic acid is added to a given solvent such as THF, and the mixture is stirred to prepare a solution F. When a plurality of phosphonic acids are used as the alkyl-based phosphonic acids, the solution F may be prepared by adding the alkyl-based phosphonic acids to given solvents such as THF, respectively, stirring the mixtures to prepare a plurality of preliminary solutions containing the respective alkyl-based phosphonic acids, and then mixing the thus-prepared preliminary solutions together. For example, an alkoxysilane monomer is added in the preparation of the solution F. The solution F is added to the solution E while stirring the solution E, and the mixture is further stirred for a given period of time. To the resultant solution is then added a given solvent such as toluene, and the mixture is stirred to obtain a solution G. Subsequently, the solution G is subjected to solvent removal for a given period of time under heating to obtain a solution H. Through this process, the solvent such as THF and the component such as acetic acid generated by disassociation of the copper salt are removed. The heating temperature of the solution G is determined in the same manner as that for the solution C, and the solvent used to obtain the solution G is also determined in the same manner as that for the solution C.

The light-absorbing composition can be prepared by, for example, mixing the solution D and the solution H at a predetermined mixing ratio, and when necessary, adding a resin such as a silicone resin. In some cases, the light-absorbing composition can be prepared by adding a resin such as a silicone resin to either one of the solution D and the solution H. Also, the solution D and the solution H each can be a light-absorbing composition by itself.

Next, an optical filter according to the present invention will be described. As shown in FIGS. 1 to 4, optical filters 1a to 1d, which are examples of the optical filter according to the present invention, each include a light-absorbing layer 10. The light-absorbing layer 10 contains a light absorber formed by a phosphonic acid represented by the following formula (a) and copper ion and a hydrolysis-polycondensation product of an alkoxysilane monomer, and does not contain a phosphoric acid ester having a polyoxyalkyl group. A normalized transmittance spectrum of each of the optical filters 1a to 1d has a first wavelength band in which the spectral transmittance is 70% or more in a wavelength range from 300 nm to 700 nm. The difference between the maximum value and the minimum value among wavelengths in this first wavelength band is 100 nm or more. The normalized transmittance spectrum is obtained by normalizing a transmittance spectrum such that a spectral transmittance at a wavelength of 700 nm is 20%. The transmittance spectrum is obtained when light having a wavelength from 300 nm to 1200 nm is perpendicularly incident on each of the optical filters 1a to 1d.

Although the optical filters 1a to 1d do not contain a phosphoric acid ester having a polyoxyalkyl group, proper dispersion of the light absorber is achieved in the optical filters 1a to 1d owing to the action of the hydrolysis-polycondensation product of the alkoxysilane monomer. Accordingly, the normalized transmittance spectra satisfies the above-described conditions. Besides, since the hydrolysis-polycondensation product of the alkoxysilane monomer has a siloxane bond (—Si—O—Si—), the light-absorbing layer 10 is moderately rigid and excellent in heat resistance, and also is unlikely to be deteriorated when exposed to water and thus excellent in weather resistance. When the optical filters 1a to 1d are configured such that the normalized transmittance spectra satisfy the above conditions, the optical filters 1a to 1d exhibit high spectral transmittances over a wide range in the visible light region. The hydrolysis-polycondensation product of the alkoxysilane monomer has a structure similar to that of silicate glass and thus is highly transparent to visible light. This also advantageously contributes to allowing the normalized transmittance spectra to satisfy the above conditions.

Examples of the phosphoric acid ester having a polyoxyalkyl group include, but not limited to, PLYSURF A208N (polyoxyethylene alkyl (C12, C13) ether phosphoric acid ester), PLYSURF A208F (polyoxyethylene alkyl (C8) ether phosphoric acid ester), PLYSURF A208B (polyoxyethylene lauryl ether phosphoric acid ester), PLYSURF A219B (polyoxyethylene lauryl ether phosphoric acid ester), PLYSURF AL (polyoxyethylene styrenated phenylether phosphoric acid ester), PLYSURF A212C (polyoxyethylene tridecyl ether phosphoric acid ester), and PLYSURF A215C (polyoxyethylene tridecyl ether phosphoric acid ester). They are all products manufactured by DKS Co., Ltd. The phosphoric acid ester may be NIKKOL DDP-2 (polyoxyethylene alkyl ether phosphoric acid ester), NIKKOL DDP-4 (polyoxyethylene alkyl ether phosphoric acid ester), or NIKKOL DDP-6 (polyoxyethylene alkyl ether phosphoric acid ester). They are all products manufactured by Nikko Chemicals Co., Ltd.

In each of the optical filters 1a to 1d, the normalized transmittance spectrum desirably has a second wavelength band in which the spectral transmittance is 80% or more in the wavelength range from 300 nm to 700 nm. The difference between the maximum value and the minimum value among wavelengths in this second wavelength band is 40 nm or more. In this case, the optical filters 1a to 1d have desirable optical properties in the visible light region.

In each of the optical filters 1a to 1d, the normalized transmittance spectrum desirably has a third wavelength band in which the spectral transmittance is 20% or less in a wavelength range from 700 nm to 1200 nm. The difference between the maximum value and the minimum value among wavelengths in this third wavelength band is 120 nm or more. In this case, the optical filters 1a to 1d can properly block light in the predetermined wavelength band in the wavelength range from 700 nm to 1200 nm. Accordingly, the optical filters 1a to 1d have desirable optical properties in the wavelength range from 700 nm to 1200 nm.

In each of the optical filters 1a to 1d, the normalized transmission spectrum desirably has a fourth wavelength band and a fifth wavelength band. The fourth wavelength band is a wavelength band in which the spectral transmittance decreases with an increase in wavelength. The fifth wavelength band is a wavelength band that includes a wavelength shorter than the minimum wavelength in the fourth wavelength band and in which the spectral transmittance increases with an increase in wavelength. A first cut-off wavelength at which the spectral transmittance is 50% in the fourth wavelength band is present in a wavelength range from 600 nm to 650 nm. A second cut-off wavelength at which the spectral transmittance is 50% in the fifth wavelength band is present in a wavelength range from 350 nm to 420 nm. The difference obtained by subtracting the second cut-off wavelength from the first cut-off wavelength is 200 nm to 290 nm. In this case, the optical filters 1a to 1d can block light having particular wavelengths and thus have optical properties advantageous in being disposed ahead of a solid-state imaging sensor, for example. In the present specification, the first cut-off wavelength is also referred to as "IR cut-off wavelength" and the second cut-off wavelength is also referred to as "UV cut-off wavelength".

In the normalized transmittance spectrum of each of the optical filters 1a to 1d, a maximum wavelength at which the maximum spectral transmittance is found is desirably present in a wavelength range from 500 nm to 550 nm. A minimum wavelength at which the minimum spectral transmittance in a wavelength range from 700 nm to 1200 nm is found is present in a wavelength range from 750 nm to 900 nm. In addition, the difference obtained by subtracting the maximum wavelength from the minimum wavelength is from 240 nm to 360 nm. In this case, the minimum wavelength and the maximum wavelength are in desirable ranges in the normalized transmittance spectra, and the optical filters 1a to 1d have desirable optical properties.

In the normalized transmittance spectrum of each of the optical filters 1a to 1d, the difference obtained by subtracting the minimum spectral transmittance in the wavelength range from 700 nm to 1200 nm in the normalized transmittance spectrum from the maximum spectral transmittance in the normalized transmittance spectrum is desirably 68% or more. In this case, the difference is large enough to impart desirable optical properties to the optical filters 1a to 1d. The difference is desirably 70% or more.

In each of the optical filters 1a to 1d, the light-absorbing layer 10 is typically formed by subjecting a film formed of the above-described light-absorbing composition to a drying treatment and a humidifying treatment. Through this process, a hydrolysis reaction and a polycondensation reaction of the alkoxysilane monomer contained in the light-absorbing composition occur, whereby the alkoxysilane monomer is converted to a hydrolysis-polycondensation product.

An example of a method for producing the light-absorbing layer 10 will be described. For example, the light-absorbing composition is applied onto a given substrate by a method such as spin coating or application using a dispenser to form a coating film of the light-absorbing composition, and a drying treatment of this coating film is performed through heating. For example, the coating film is exposed to an environment at a temperature from 50° C. to 200° C. Next, the dried coating film is subjected to a humidifying treatment in order to sufficiently promote a hydrolysis reaction and a polycondensation reaction of the alkoxysilane monomer. For example, the dried coating film is exposed to an environment at a temperature from 50° C. to 100° C. and a relative humidity from 60% to 100%. Through this process, repeating structures $(Si-O)_n$ of a siloxane bond are formed. In this manner, the light-absorbing layer 10 is formed. From the viewpoint of forming a firm light-absorbing layer 10 as well as improving the optical properties of the optical filters 1a to 1d, the maximum value of the ambient temperature at which the coating film is subjected to the drying treatment is, for example, 85° C. or higher. The conditions for the humidifying treatment of the coating film are not particularly limited as long as the hydrolysis reaction and the polycondensation reaction of the alkoxysilane monomer can be promoted sufficiently. The humidifying treatment of the coating film is performed by, for example, exposing the coating film for a given period of time to an environment in which the temperature condition, which is 50° C. to 100° C., and the relative humidity condition, which is 60% to 100%, are combined as appropriate. An example of the combination of the temperature condition and relative humidity condition of the humidifying treatment of the coating film is the combination of a temperature of 85° C. and a relative humidity of 85%.

In each of the optical filters 1a to 1d, the light-absorbing layer 10 has a thickness of, for example, 400 μm or less, desirably 300 μm or less, and more desirably 250 μm or less. With this configuration, the optical filters 1a to 1d are likely to have desired optical properties. As described above, the light-absorbing composition can reduce the amount of resin to be used therein. Accordingly, by using the light-absorbing composition, such a small thickness of the light-absorbing layer 10 can be achieved easily. The small thickness of the light-absorbing layer 10 is advantageous for reducing the height of a device on which each of the optical filters 1a to 1d is to be mounted. In each of the optical filters 1a to 1d, the light-absorbing layer 10 has a thickness of 30 μm or more, for example.

As shown in FIG. 1, the optical filter 1a further includes a transparent dielectric substrate 20. The light-absorbing layer 10 is formed parallel to one principal surface of the transparent dielectric substrate 20. The light-absorbing layer 10 may be in contact with one principal surface of the transparent dielectric substrate 20, for example. In this case, a coating film of the light-absorbing composition is formed on the one principal surface of the transparent dielectric substrate 20 to form the light-absorbing layer 10 in the above-described manner.

The type of the transparent dielectric substrate 20 is not particularly limited as long as the normalized transmittance spectrum of the optical filter 1a satisfies the above-described conditions. In some cases, the transparent dielectric substrate 20 may have the ability to absorb light in the infrared region. The transparent dielectric substrate 20 may have an average spectral transmittance of 90% or more in, for example, a wavelength range from 350 nm to 900 nm. The material of the transparent dielectric substrate 20 is not limited to any particular material, and the material is, for example, a certain type of glass or resin. When the material of the transparent dielectric substrate 20 is glass, the transparent dielectric substrate 20 is, for example, a transparent glass substrate made of a silicate glass such as soda-lime glass or borosilicate glass, or an infrared cut glass substrate. The infrared cut glass substrate is made of, for example, phosphate glass or fluorophosphate glass, each containing CuO.

When the material of the transparent dielectric substrate 20 is a resin, the resin is, for example, a cyclic olefin-based resin such as a norbornene-based resin, a polyarylate-based resin, an acrylic resin, a modified acrylic resin, a polyimide resin, a polyetherimide resin, a polysulfone resin, a polyethersulfone resin, a polycarbonate resin, or a silicone resin.

The optical filter 1b according to another example of the present invention has the same configuration as the optical filter 1a, unless otherwise stated. The descriptions regarding the optical filter 1a also apply to the optical filter 1b, unless technically incompatible.

Figure 2:
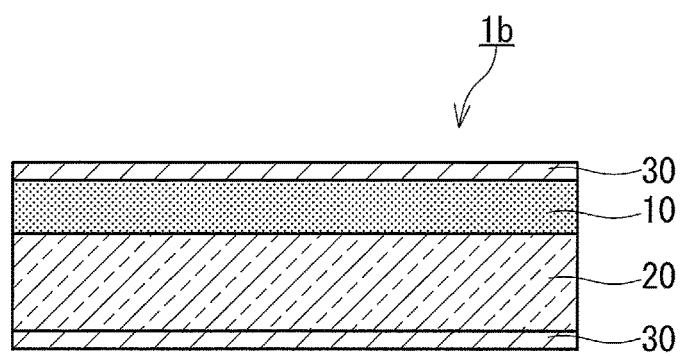
FIG. 2 is a cross-sectional view showing another example of the optical filter of the present invention.

As shown in FIG. 2, the optical filter 1b further includes infrared-reflecting films 30. The infrared-reflecting film 30 is a film formed by alternately laminating a plurality of materials having different refractive indices. Examples of the material forming the infrared-reflecting films 30 include inorganic materials such as $SiO_2$, $TiO_2$, and $MgF_2$ and organic materials such as fluorine resins. The laminate including the infrared-reflecting films 30 transmits light having wavelengths from 350 nm to 800 nm and reflects light having wavelengths from 850 nm to 1200 nm, for example. The laminate including the infrared-reflecting films 30 has a spectral transmittance of, for example, 85% or more, desirably 90% or more, in a wavelength range from 350 nm to 800 nm and has a spectral transmittance of, for example, 1% or less, desirably 0.5% or less, in a wavelength range from 850 nm to 1200 nm. With this configuration, the optical filter 1b can more effectively block light having wavelengths in a range from 850 nm to 1200 nm or in a range from 900 nm to 1200 nm.

The method for forming the infrared-reflecting films 30 of the optical filter 1b is not particularly limited, and any of vacuum deposition, sputtering, chemical vapor deposition (CVD), and sol-gel process employing spin coating or spray coating can be used according to the type of the material forming the infrared-reflecting films 30.

Figure 3:
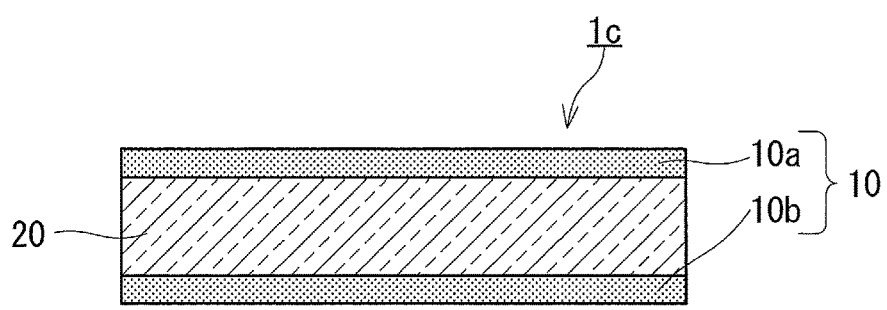
FIG. 3 is a cross-sectional view showing still another example of the optical filter of the present invention.

As shown in FIG. 3, in the optical filter 1c according to still another example of the present invention, the light-absorbing layer 10 includes a first light-absorbing layer 10a and a second light-absorbing layer 10b, which are spaced apart from each other with a transparent dielectric substrate 20 interposed therebetween. Each of the first light-absorbing layer 10a and the second light-absorbing layer 10b is formed parallel to one principal surface of the transparent dielectric substrate 20 and in contact with the transparent dielectric substrate 20. With this configuration, the light-absorbing layer thickness required for the optical filter 1c to have desired optical properties can be secured by the two light-absorbing layers. The thicknesses of the first light-absorbing layer 10a and the second light-absorbing layer 10b may be the same or different from each other. That is, the first absorbing layer 10a and the second light-absorbing layer 10b are formed in such a manner that the first absorbing layer 10a and the second light-absorbing layer 10b account for equal or unequal proportions of the thickness of the light-absorbing layer 10 required for the optical filter 1c to have desired optical properties. Thus, the first light-absorbing layer 10a and the second light-absorbing layer 10b each have a relatively small thickness. This can suppress the occurrence of non-uniformity in the thickness of a light absorbing layer while such may occur when the absorbing layer has a large thickness. In addition, it is possible to shorten the time required for applying the light-absorbing composition and also to shorten the time required for drying the coating film of the light-absorbing composition. If the light-absorbing layer 10 is formed only on one principal surface of a very thin transparent dielectric substrate, the optical filter may be warped owing to a stress caused by shrinkage occurring during the formation of the light-absorbing layer from the light-absorbing composition. In contrast, by forming the light-absorbing layers 10 on both principal surfaces of the transparent dielectric substrate 20, warping of the optical filter 1c can be suppressed even when the transparent dielectric substrate 20 is very thin.

Figure 4:
FIG. 4 is a cross-sectional view showing still another example of the optical filter of the present invention.

As shown in FIG. 4, the optical filter 1d according to still another example of the present invention is constituted only by the light-absorbing layer 10. The optical filter 1d can be produced by, for example, forming the light-absorbing layer 10 on a substrate and then separating the light-absorbing layer 10 from the substrate. In this case, the material of the substrate is not limited to a transparent dielectric material, and for example, a metal substrate also can be used.

Figure 5:
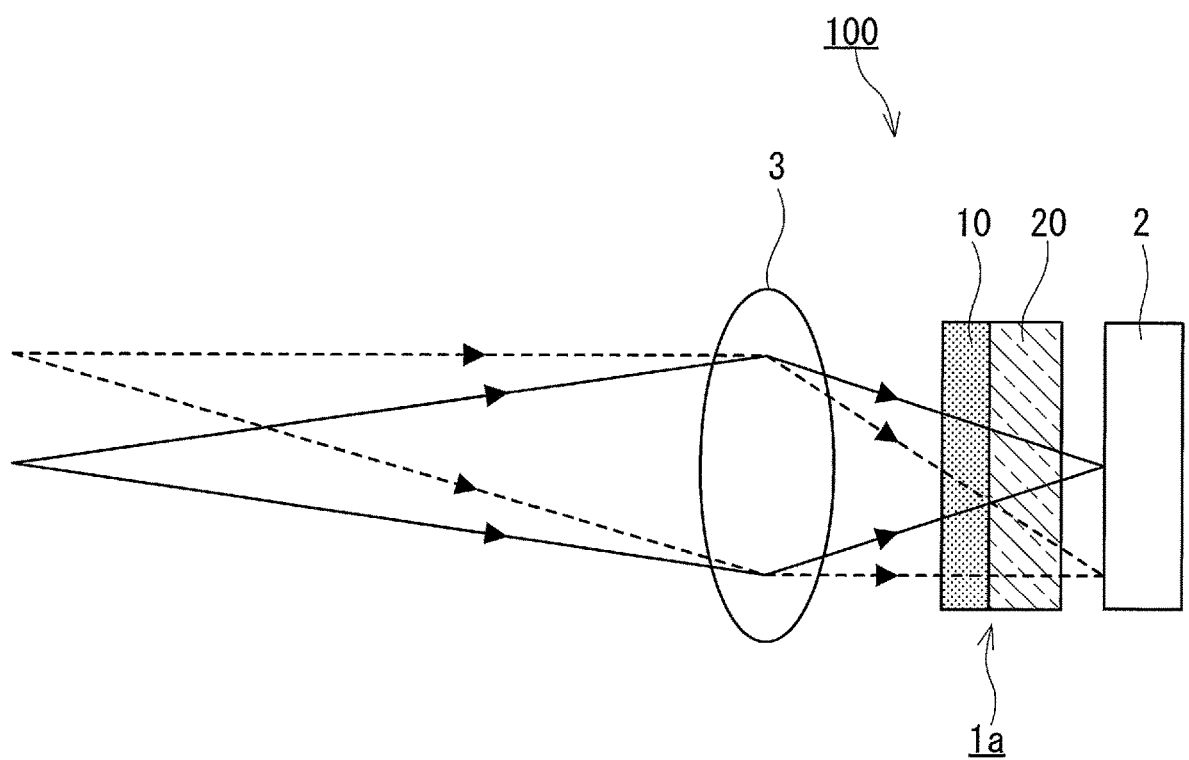
FIG. 5 is a cross-sectional view of an example of an imaging optical system of the present invention.

As shown in FIG. 5, for example, the optical filter 1a can be used to provide an imaging optical system 100. In addition to the optical filter 1a, the imaging optical system 100 further includes an imaging lens 3, for example. In an imaging apparatus such as a digital camera, the imaging optical system 100 is disposed ahead of an imaging sensor 2. The imaging sensor 2 is, for example, a solid-state imaging sensor such as a CCD or CMOS. As shown in FIG. 5, light from an object to be imaged is focused by the imaging lens 3, light beams having particular wavelengths are cut off from the light by the optical filter 1a, and then the light is incident on the imaging sensor 2. The imaging optical system 100 may include, instead of the optical filter 1a, any of the optical filters 1b, 1c, and 1d.

EXAMPLES

The present invention will be described in more detail by way of examples. It is to be noted, however, that the present invention is not limited to the examples to be described below. First, methods for evaluating optical filters according to examples and comparative examples will be described.

<Measurement of Thickness of Light-Absorbing Layer>

The thicknesses of the optical filters according to the examples and the comparative examples were measured with a digital micrometer. In most of the examples, the thickness of a light-absorbing layer included in each of the optical filters was calculated by subtracting the thickness of a transparent glass substrate from the thickness of the optical filter. In Example 35, the thickness of the light-absorbing layer was measured directly with a digital micrometer.

<Measurement of Transmittance Spectrum of Optical Filter>

Transmittance spectra obtained when light having wavelengths in a range from 300 nm to 1200 nm was incident on the optical filters according to the examples and the comparative examples were measured using an ultraviolet-visible spectrophotometer (manufactured by JASCO Corporation, product name: V-670). In this measurement, the incident angle of the light incident on each optical filter was set to 0° (degree).

<Determination of Normalized Transmittance Spectrum>

The light absorption property, i.e., the transmittance spectrum, of an optical filter changes according to the thickness of a light-absorbing layer in the optical filter. When various samples are prepared to compare their performances or to adjust the production conditions, it is appropriate to evaluate the measured transmittance spectra of optical filters by normalizing them on the basis of a certain index. Accordingly, transmittance spectra of the optical filters according to the examples and comparative examples measured in a wavelength range from 300 nm to 1200 nm were normalized in such a manner that the spectral transmittance at a wavelength of 700 nm was 20%, thereby determining the normalized transmittance spectra. Specifically, the following calculations (1) to (4) were performed.

(1) In the transmittance spectrum measured for each of the optical filters according to the examples and comparative examples, the spectral transmittance for each wavelength was multiplied by 100/92 to obtain a second spectral transmittance in which reflection on both surfaces of the optical filter was approximately canceled.

(2) In consideration of the fact that a transparent glass substrate (manufactured by SCHOTT AG, product name: D 263 T eco) provided in each of the optical filters of most of the examples and the comparative examples does not substantially absorb light having wavelengths in a range from 350 nm to 1200 nm, the absorption coefficient of the light-absorbing layer was determined for each wavelength from the thickness of the light-absorbing layer in the optical filter and the second spectral transmittance.

(3) Next, regarding the optical filter provided with the light-absorbing layer having the thus-determined absorption coefficient, the spectral transmittance when the thickness of the light-absorbing layer was changed was calculated for each wavelength. In this case, each of the calculated values was multiplied by 100/92 to calculate the spectral transmittance with consideration given to the surface reflection of the optical filter beforehand. The thickness (calculated thickness) of the light-absorbing layer was determined in such a manner that the thus-calculated spectral transmittance at 700 nm was 20%.

(4) On the basis of the calculated thickness of the light-absorbing layer determined in the step (3), the spectral transmittance of the optical filter according to each of the examples and the comparative examples was determined for each wavelength to obtain a transmittance spectrum. The thus-obtained transmittance spectrum was determined as a normalized transmittance spectrum.

Example 1

1.125 g of copper acetate monohydrate and 60 g of tetrahydrofuran (THF) were mixed together, and the mixture was stirred for 3 hours to obtain a solution A. Next, 10 g of THF was added to 0.447 g of phenylphosphonic acid, and the mixture was stirred for 30 minutes to obtain a solution B-1. Further, 10 g of THF was added to 0.670 g of 4-bromophenylphosphonic acid, and the mixture was stirred for 30 minutes to obtain a solution B-2. Next, the solutions B-1 and B-2 were mixed together, and the mixture was stirred for 1 minute. 5.415 g of methyltriethoxysilane (MTES, manufactured by Shin-Etsu Chemical Co., Ltd.) and 1.775 g of tetraethoxysilane (TEOS, manufactured by KISHIDA CHEMICAL Co., Ltd., special grade) were added thereto, and the mixture was stirred for another 1 minute to obtain a solution B. The solution B was added to the solution A while stirring the solution A, and the mixture was stirred at room temperature for 1 minute. Next, 40 g of toluene was added to this solution, and the mixture was then stirred at room temperature for 1 minute to obtain a solution C. This solution C was poured into a flask and subjected to solvent removal using a rotary evaporator (manufactured by Tokyo Rikakikai Co. Ltd., model: N-1110SF) under heating by means of an oil bath (manufactured by Tokyo Rikakikai Co. Ltd., model: OSB-2100). The temperature of the oil bath was controlled to 85° C. A solution D obtained after the solvent removal was collected from the flask. The solution D, which is a dispersion of fine particles of copper phenyl-based phosphonate (light absorber), was transparent, and the fine particles were well dispersed therein.

0.450 g of copper acetate monohydrate and 24 g of THF were mixed together, and the mixture was stirred for 3 hours to obtain a solution E. Further, 10 g of THF was added to 0.257 g of n-butylphosphonic acid (manufactured by Nippon Chemical Industries), and the mixture was stirred for 30 minutes. 2.166 g of methyltriethoxysilane (MTES: manufactured by Shin-Etsu Chemical Co., Ltd.) and 0.710 g of tetraethoxysilane (TEOS, manufactured by KISHIDA CHEMICAL Co., Ltd., special grade) were further added thereto, and the mixture was stirred for another 1 minute to obtain a solution F. The solution F was added to the solution E while stirring the solution E, and the mixture was stirred at room temperature for 1 minute. Next, 16 g of toluene was added to this solution, and the mixture was then stirred at room temperature for 1 minute to obtain a solution G. This solution G was poured into a flask and subjected to solvent removal using a rotary evaporator under heating by means of an oil bath. The temperature of the oil bath was controlled to 85° C. A solution H obtained after the solvent removal was collected from the flask. The solution H, which is a dispersion of fine particles of copper butylphosphonate (light absorber) was transparent, and the fine particles were well dispersed therein.

16 g of silicone resin KR-311 (Shin-Etsu Chemical Co., Ltd., the content of nonvlatile components: 60 mass %) and 4 g of silicone resin KR -300 (Shin-Etsu Chemical Co., Ltd., the non-volatile content: 50 mass %) were mixed together, and the mixture was stirred for 10 minutes to obtain a resin composition Y. The solid (non-volatile) content of the resin composition Y was determined to be 58 mass % as per the relationship of: 60 mass %×16/20+50 mass %×4/20.

8.800 g of the resin composition Y was added to the solution D, and the mixture was stirred for 5 minutes to obtain a solution I. The solution H was added to the thus-obtained solution I, and the mixture was stirred for 10 minutes. Thus, a light-absorbing composition according to Example 1 was obtained. The contents of the respective components in the light-absorbing composition according to Example 1 on a mass basis and on an amount-of-substance basis are shown in Table 1 and Table 2, respectively. The solid content of the alkoxysilane monomer was determined by converting the content of the alkoxysilane monomer into the amount of a hydrolysis-polycondensation product of the alkoxysilane monomer.

Figure 6:
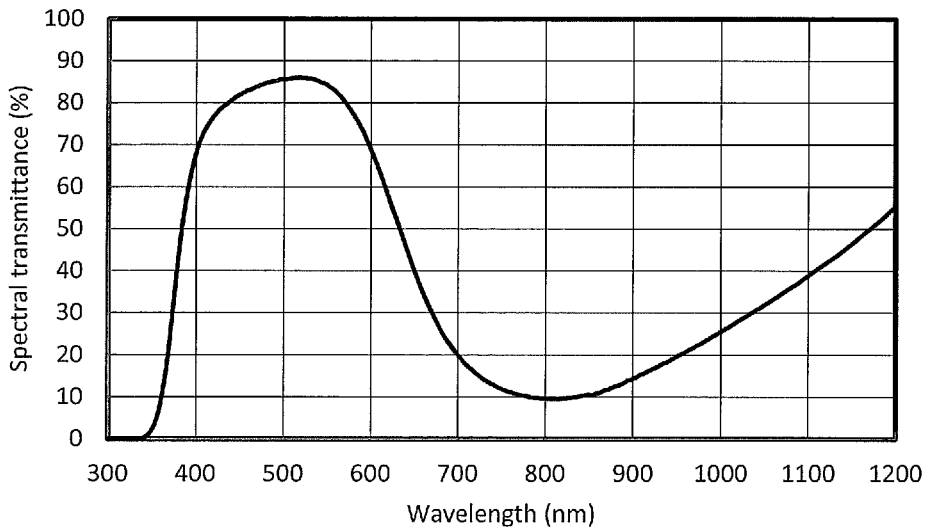
FIG. 6 shows a normalized transmittance spectrum of an optical filter according to Example 1.

The light-absorbing composition according to Example 1 was applied using a dispenser to a 30 mm×30 mm central region of one principal surface of a transparent glass substrate (SCHOTT AG, product name: D263 T eco) made of borosilicate glass and having dimensions of 76 mm×76 mm×0.21 mm to form a coating film of the light-absorbing composition. At this time, a frame having an opening corresponding to the application area of the light-absorbing composition was placed on the one principal surface of the transparent glass substrate to prevent the light-absorbing composition from flowing over the application area. Next, the transparent glass substrate with the undried coating film was placed in an oven and heat-treated at 85° C. for 6 hours to cure the coating film. Thereafter, the transparent glass substrate provided with the coating film was subjected to a humidifying treatment by being placed in a thermo-hygrostat set at a temperature of 85° C. and a relative humidity of 85% for 2 hours. Then, a portion where the light-absorbing layer with a fixed thickness was formed was cut out to produce an optical filter according to Example 1. The thickness of the light-absorbing layer in the optical filter according to Example 1 was 158 µm. The normalized transmittance spectrum of the optical filter according to Example 1 is shown in FIG. 6. Also, optical properties read from the normalized transmittance spectrum of the optical filter according to Example 1 are shown in Table 7.

Other Examples and Comparative Examples

Light-absorbing compositions according to Examples 2 to 63 and light-absorbing compositions according to Comparative Example 1 to 12 were prepared in the same manner as in Example 1, except that the amounts of respective components of the light-absorbing compositions were adjusted as shown in Tables 1 to 6. The light-absorbing compositions according to Examples 11, 36, and 37 contained methyltrimethoxysilane (MTMS) instead of MTES, and the light-absorbing compositions of Examples 12, 13, 38, and 39 contained dimethyldiethoxysilane (DMDES) instead of MTES. 8 g of silicone resin KR-212(Shin-Etsu Chemical Co., Ltd., the non-volatile content: 70 mass %) and 12 g of silicone resin KR-300 (Shin-Etsu Chemical Co., Ltd., the non-volatile content: 50 mass %) were mixed together, and the mixture was stirred for 10 minutes to obtain a resin composition X. Also, silicone resin KR-5230 (Shin-Etsu Chemical Co., Ltd., the non-volatile content: 60 mass %) was used as a resin composition Z. The solid content of the resin composition X was determined to be 58 mass % in the same manner as that for determining the solid content of the resin composition Y. The solid content of the resin composition Z was determined to be 60 mass %.

Optical filters according to Examples 2 to 63 were produced in the same manner as in Example 1, except that, instead of the light-absorbing composition according to Example 1, the light-absorbing compositions according to Examples 2 to 63 were used, respectively. The optical filter according to Example 35 was produced by separating the light-absorbing layer from the transparent glass substrate, and thus was constituted only by the light-absorbing layer. Optical filters according to Comparative Examples 1 to 4, 6 to 9, and 11 were produced in the same manner as in Example 1, except that, instead of the light-absorbing composition according to Example 1, the light-absorbing compositions according to Comparative Examples 1 to 4, 6 to 9, and 11 were used, respectively.

Figure 7:
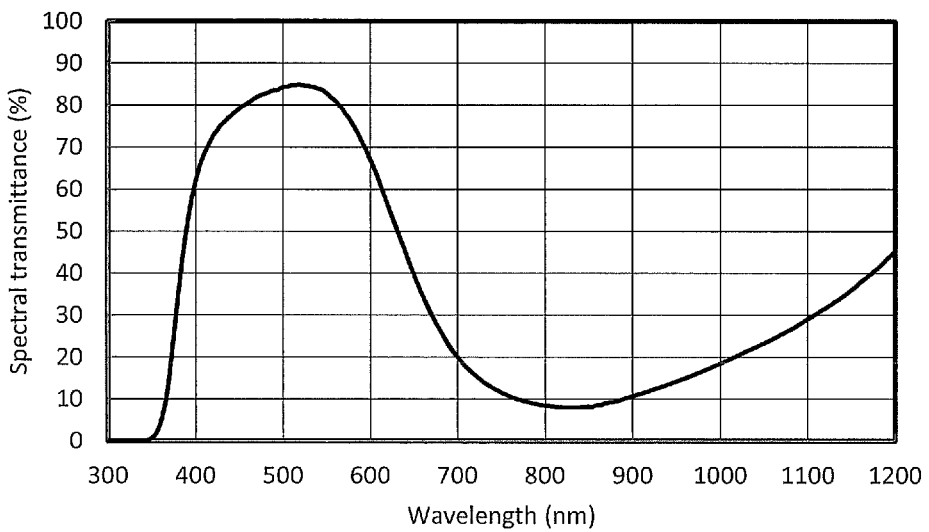
FIG. 7 shows a normalized transmittance spectrum of an optical filter according to Example 2.
Figure 8:
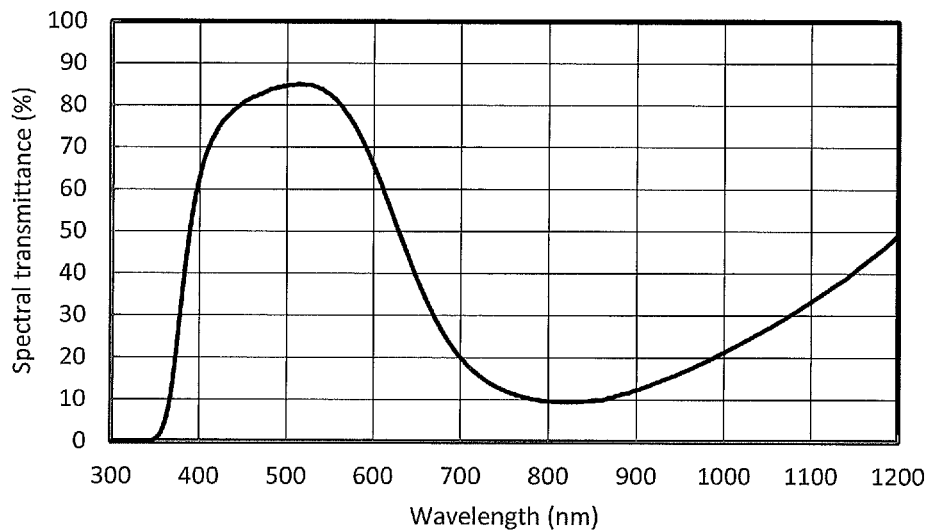
FIG. 8 shows a normalized transmittance spectrum of an optical filter according to Example 10.

The normalized transmittance spectra of the optical filters according to Examples 2 and 10 are shown in FIGS. 7 and 8, respectively. Also, optical properties read from the normalized transmittance spectra of the optical filters according to Examples 2 to 10 are shown in Table 7. It can be seen from Table 7 that, even if the amount of MTES and the amount of TEOS contained in the light-absorbing compositions are changed within predetermined ranges, optical filters still have favorable optical properties. The amount of the alkoxysilane monomer contained in the light-absorbing composition according to Example 10 was about 6 times greater than the amount of the alkoxysilane monomer contained in the light-absorbing composition according to Example 2 on a mass basis. Thus, it can be seen that a relatively high content of the alkoxysilane monomer in the light-absorbing composition beyond the minimum limit required for dispersing the light absorber does not hinder the production of an optical filter having good optical properties. This is considered to be relevant to the fact that the hydrolysis-polycondensation product of the alkoxysilane monomer has a skeleton similar to that of silicate glass owing to a siloxane bond (—Si—O—Si—) formed therein and has high transparency to visible light. One advantage of the alkoxysilane monomer over other dispersants such as a phosphoric acid ester having a polyoxyalkyl group is that a change in the added amount of the light-absorbing composition is less likely to affect the optical properties of an optical filter.

From the results obtained regarding the optical filters according to Example 1 to 10 as shown in Table 7, it can be seen that an optical filter having good optical properties can be produced even if the type and the amount of silicone resin used in the light-absorbing composition are changed.

Comparative Examples 1 and 2

Figure 9:
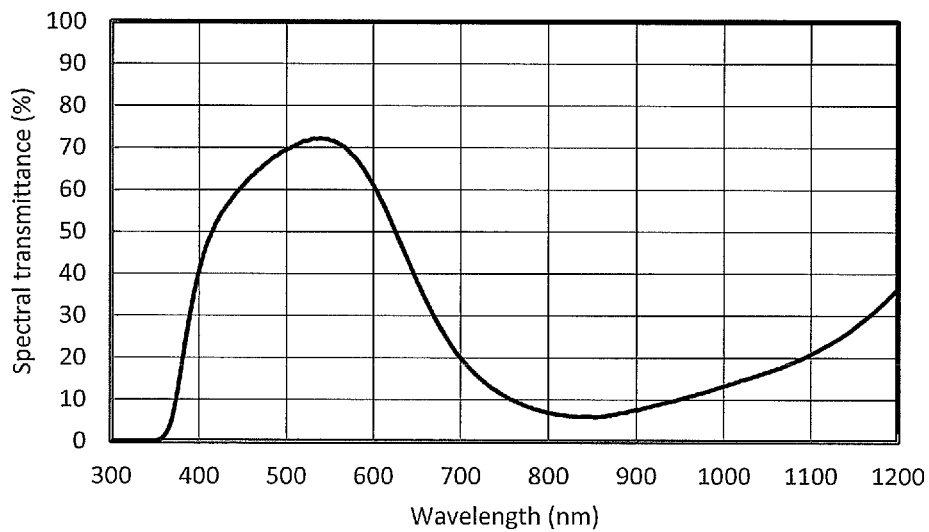
FIG. 9 shows a normalized transmittance spectrum of an optical filter according to Comparative Example 2.

The normalized transmittance spectrum of the optical filter according to Comparative Example 2 is shown in FIG. 9. Also, optical properties read from the normalized transmittance spectrum of the optical filter according to Comparative Example 1 and from the normalized transmittance spectrum of the optical filter according to Comparative Example 2 are shown in Table 12.

In Comparative Example 1, the solution containing the light absorber formed by the alkyl-based phosphonic acid and copper ion was transparent, whereas the solution containing the light absorber formed by the phenyl-based phosphonic acid and copper ion was turbid. In addition, the optical filter of Comparative Example 1 was whitish, and the optical filter of Comparative Example 1 exhibited a very low transmittance in the visible light region. The reason for this is considered to be that the content of the alkoxysilane monomer in the light-absorbing composition was not sufficient.

In Comparative Example 2, the solution containing the light absorber formed by the alkyl-based phosphonic acid and copper ion and the solution containing the light absorber formed by the phenyl-based phosphonic acid and copper ion had a high transparency. However, the optical filter according to Comparative Example 2 had a low transmittance in the visible light region. The results obtained in Comparative Example 2 suggest that the content of the alkoxysilane monomer in the light-absorbing composition according to Comparative Example 2 was slightly lower than the amount required for producing an optical filter having good optical properties.

Examples 11 to 13

Figure 10:
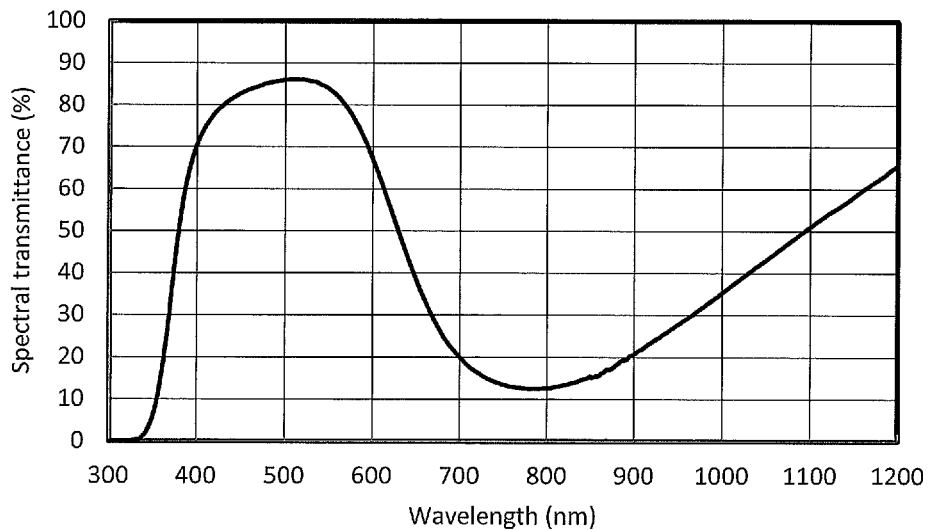
FIG. 10 shows a normalized transmittance spectrum of an optical filter according to Example 11.
Figure 11:
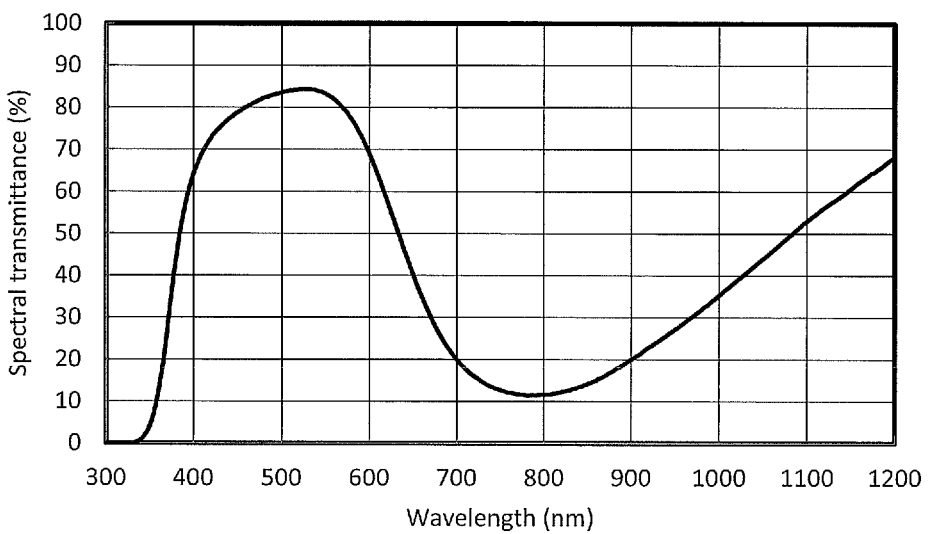
FIG. 11 shows a normalized transmittance spectrum of an optical filter according to Example 12.

The normalized transmittance spectra of the optical filters according to Examples 11 and 12 are shown in FIGS. 10 and 11, respectively. Also, optical properties read from the normalized transmittance spectra of the optical filters according to Examples 11 to 13 are shown in Table 8. The light-absorbing composition according to Example 11 contained, as the alkoxysilane monomer, MTMS instead of MTES. MTES has three ethoxy groups, whereas MTMS has three methoxy groups. The content of MTMS in the light-absorbing composition according to Example 11 was adjusted so as to be roughly equivalent to the content of MTES in the light-absorbing composition of Example 1 as expressed in terms of solid components of the alkoxysilane monomer on a mass basis. From the results obtained regarding Example 11 as shown in Table 8, it can be seen that an optical filter having good optical properties can be produced using MTMS as the alkoxysilane monomer. This demonstrates that, in order to produce an optical filter having good optical properties, there are various options in the type of alkoxy group in the alkoxysilane monomer.

The light-absorbing compositions according to Examples 12 and 13 contained, as the alkoxysilane monomer, DMDES instead of MTES. The content of DMDES in each of the light-absorbing compositions of Examples 12 and 13 was adjusted so as to be roughly equivalent to the content of MTES in the light-absorbing composition of Example 1 as expressed in terms of solid components of the alkoxysilane monomer on a mass basis. From the results obtained regarding Examples 12 and 13 as shown in Table 8, it can be seen that an optical filter having good optical properties can be produced using DMDES as the alkoxysilane monomer. DMDES has two methyl groups, and it was expected that these methyl groups contribute to steric hindrance, and similar to MTES, DMDES would bring about advantageous effects. The effects as expected were obtained in the optical filters according to Examples 12 and 13. These results demonstrate that the light-absorbing composition can properly disperse the light absorber regardless of the number of alkyl groups of the alkoxysilane monomer contained therein.

Example 14

Figure 12:
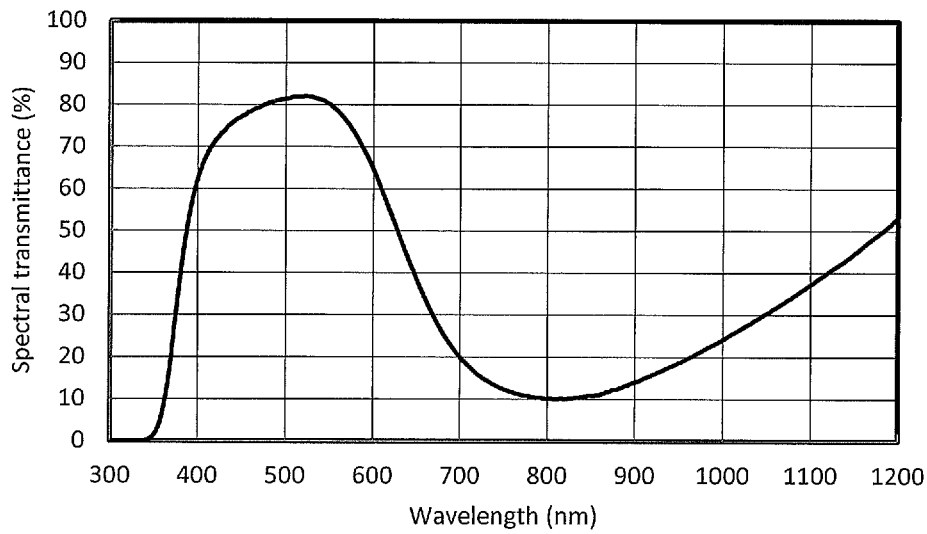
FIG. 12 shows a normalized transmittance spectrum of an optical filter according to Example 14.

The normalized transmittance spectrum of the optical filter according to Example 14 is shown in FIG. 12. Also, optical properties read from the normalized transmittance spectrum of the optical filter according to Example 14 are shown in Table 8. The light-absorbing composition according to Example 14 contained only MTES as the alkoxysilane monomer. As can be seen from the results obtained in Example 14 as shown in FIG. 12 and Table 8, the optical filter according to Example 14 had good optical properties. This demonstrates that it is not essential that the light-absorbing composition contains TEOS as the alkoxysilane monomer, and it is advantageous that the light-absorbing composition contains an alkoxysilane monomer having an alkyl group.

Comparative Example 3

Figure 13:
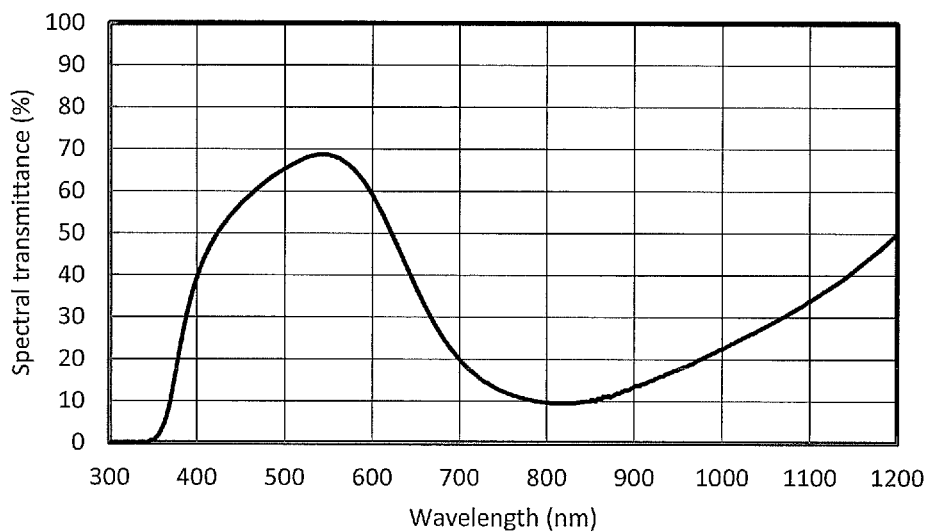
FIG. 13 shows a normalized transmittance spectrum of an optical filter according to Comparative Example 3.

The normalized transmittance spectrum of the optical filter according to Comparative Example 3 is shown in FIG. 13. Also, optical properties read from the normalized transmittance spectrum of the optical filter according to Comparative Example 3 are shown in Table 12. The content of the alkoxysilane monomer in the light-absorbing composition of Comparative Example 3 was lower than that in the light-absorbing composition of Example 14. The solution containing the light absorber formed by the alkyl-based phosphonic acid and copper ion and the solution containing the light absorber formed by the phenyl-based phosphonic acid and copper ion, which were both prepared to obtain the light-absorbing composition according to Comparative Example 3, had a high transparency. However, the optical filter according to Comparative Example 3 had a low transmittance in the visible light region and did not have good optical properties. These results suggest that the content of the alkoxysilane monomer in the light-absorbing composition of Comparative Example 3 was slightly lower than the amount required for producing an optical filter having good optical properties.

Comparative Example 4

Optical properties read from the normalized transmittance spectrum of the optical filter according to Comparative Example 4 are shown in Table 12. As shown in Table 5, in the light-absorbing composition according to Comparative Example 4, the ratio between the amount of the solid components of MTES and the amount of the solid components of TEOS was adjusted to about 1:1 on a mass basis. The content of the alkoxysilane monomer in the light-absorbing composition according to Comparative Example 4 was adjusted so as to be roughly equivalent to the content of the alkoxysilane monomer in the light-absorbing composition of Comparative Example 2 as expressed in terms of solid components of the alkoxysilane monomer on a mass basis. The optical filter according to Comparative Example 4 had a low transmittance in the visible light region. The reason for this is considered to be that the alkoxysilane monomer could not sufficiently exhibit the function of suppressing aggregation of the light absorber. From this result, it can be seen that, in order to impart good optical properties to an optical filter by a light-absorbing composition, the added amount of an alkoxysilane monomer having an alkyl group makes more advantageous contribution than the added amount of an alkoxysilane monomer and the final amount of solid components of an alkoxysilane monomer. It is suggested that the steric hindrance caused by the methyl group of MTES allows an optical filter to exhibit good optical properties.

Example 15

Optical properties read from the normalized transmittance spectrum of the optical filter according to Example 15 are shown in Table 8. As shown in Table 1, in the light-absorbing composition according to Example 15, the ratio between the amount of solid components of MTES and the amount of solid components of TEOS was adjusted to about 1:1 on a mass basis, as in Comparative Example 4. The content of the alkoxysilane monomer in the light-absorbing composition according to Example 15 was adjusted so as to be roughly equivalent to the content of the alkoxysilane monomer in the light-absorbing composition of Example 1 as expressed in terms of solid components of the alkoxysilane monomer on a mass basis. As shown in Table 8, the optical filter according to Example 15 had good optical properties. It is considered that the difference in optical properties between the optical filter of Example 15 and the optical filter of Comparative Example 4 is caused by the fact that the content of MTES in the light-absorbing composition of Example 15 was sufficient to prevent aggregation of the light absorber.

Examples 16 and 17

Figure 14:
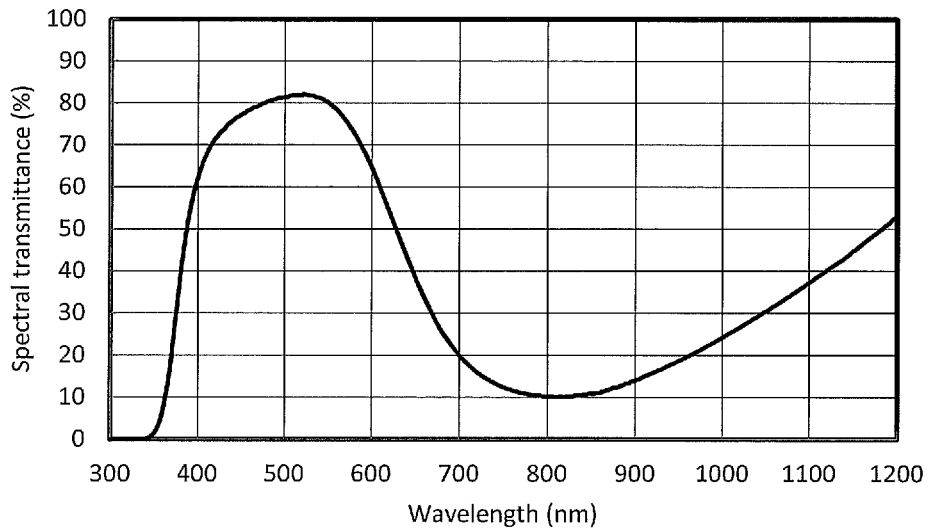
FIG. 14 shows a normalized transmittance spectrum of an optical filter according to Example 16.

The normalized transmittance spectrum of the optical filter according to Example 16 is shown in FIG. 14. Also, optical properties read from the normalized transmittance spectra of the optical filters according to Examples 16 and 17 are shown in Table 8. As shown in Table 1, in each of the light-absorbing compositions according to Examples 16 and 17, the ratio between the amount of the solid components of MTES and the amount of the solid components of TEOS was adjusted to about 3:7 on a mass basis. The amount of the solid components of the alkoxysilane monomer in each of the light-absorbing compositions according to Examples 16 and 17 was larger than that in the light-absorbing composition of Example 1. As shown in Table 8, the optical filters according to Examples 16 and 17 had good optical properties. Comparison with the results obtained regarding the light-absorbing compositions of Comparative Examples 2 and 4 suggests that the content of MTES in each of the light-absorbing compositions of Examples 16 and 17 was sufficient to prevent aggregation of the light absorber.

Comparative Example 5

As shown in Table 5, the light-absorbing composition according to Comparative Example 5 contained only TEOS as the alkoxysilane monomer. Although the content of TEOS in the light-absorbing composition of Comparative Example 5 was relatively large, the light-absorbing composition of Comparative Example 5 was turbid and a suitable optical filter could not be obtained.

Examples 18 and 19

Figure 15:
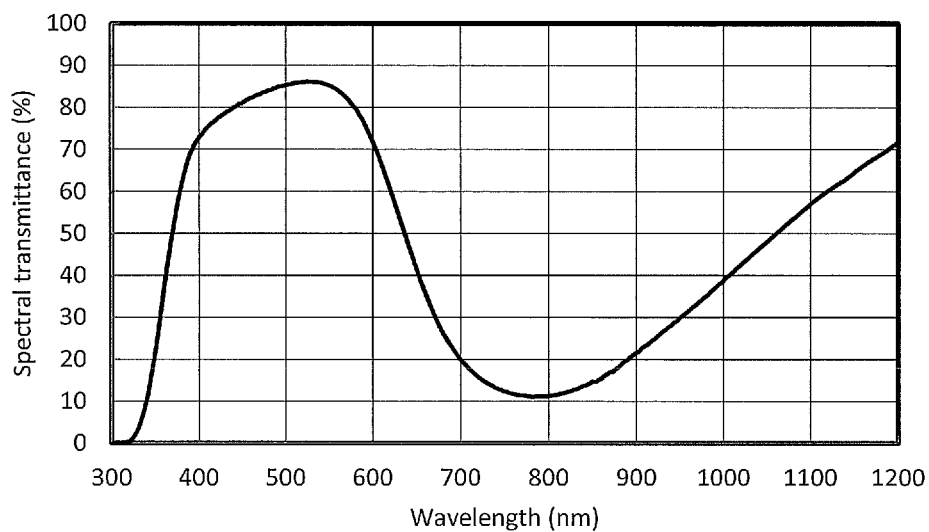
FIG. 15 shows a normalized transmittance spectrum of an optical filter according to Example 18.

The normalized transmittance spectrum of the optical filter according to Example 18 is shown in FIG. 15. Also, optical properties read from the normalized transmittance spectra of the optical filters according to Examples 18 and 19 are shown in Table 8. The content of a phenyl-based phosphonic acid in each of the light-absorbing compositions of Examples 18 and 19 was adjusted so as to be roughly equivalent to the content of the phenyl-based phosphonic acid in each of the light-absorbing composition of Examples 1 to 17 on an amount-of-substance basis. However, the light-absorbing compositions according to Examples 18 and 19 contained only phenylphosphonic acid as the phenyl-based phosphonic acid. As shown in Table 8, the optical filters according to Examples 18 and 19 had good optical properties. From these result, it can be seen that an optical filter having good optical properties can be produced using the light-absorbing composition containing a phenyl-based phosphonic acid that does not include a halogenated phenylphosphonic acid and a butylphosphonic acid.

Examples 20 and 21

Figure 16:
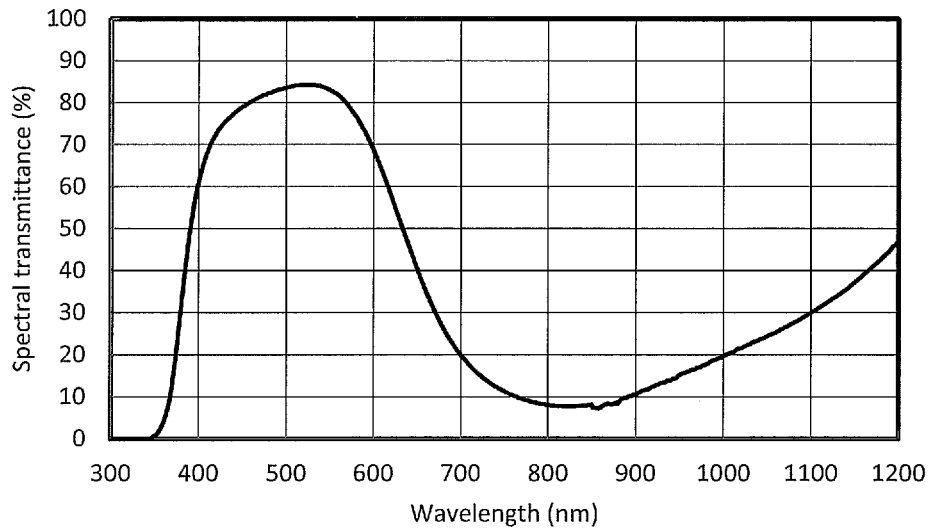
FIG. 16 shows a normalized transmittance spectrum of an optical filter according to Example 20.

The normalized transmittance spectrum of the optical filter according to Example 20 is shown in FIG. 16. Also, optical properties read from the normalized transmittance spectra of the optical filters according to Examples 20 and 21 are shown in Table 8. As shown in Table 2, in each of the light-absorbing compositions according to Examples 20 and 21, the ratio between the content of phenylphosphonic acid and the content of bromophenylphosphonic acid was adjusted to about 3:7 on an amount-of-substance basis. As shown in Table 8, the optical filters according to Examples 20 and 21 had good optical properties. In the light-absorbing composition of Example 1, the ratio between the content of the phenylphosphonic acid and the content of bromophenylphosphonic acid was about 1:1 on an amount-of-substance basis. From the results obtained regarding Examples 20 and 21, it can be seen that, even if the ratio between the content of phenylphosphonic acid and the content of bromophenylphosphonic acid in the light-absorbing composition is changed, an optical filter still has good optical properties.

Examples 22 and 23

Figure 17:
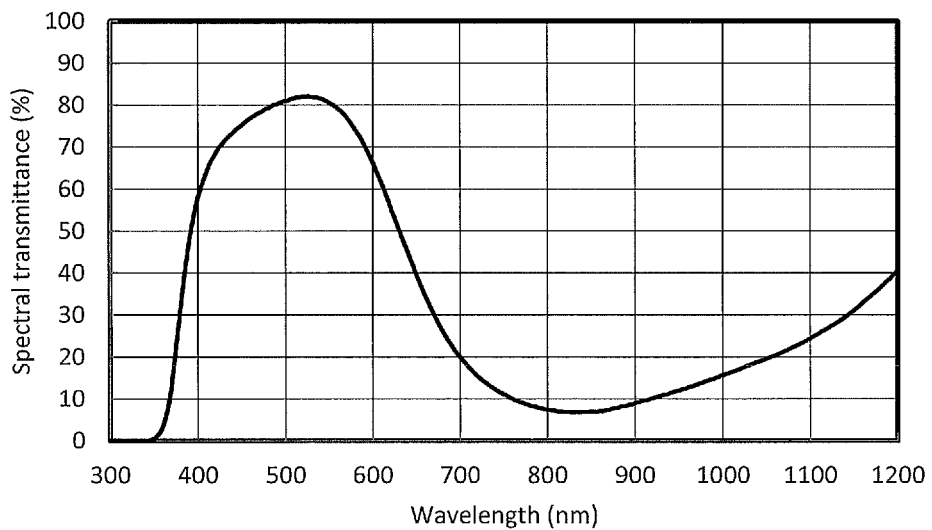
FIG. 17 shows a normalized transmittance spectrum of an optical filter according to Example 22.

The normalized transmittance spectrum of the optical filter according to Example 22 is shown in FIG. 17. Also, optical properties read from the normalized transmittance spectra of the optical filters according to Examples 22 and 23 are shown in Table 8. The light-absorbing compositions of Examples 22 and 23 contained chlorophenylphosphonic acid instead of the bromophenylphosphonic acid contained in the light-absorbing composition of Example 1. As shown in Table 8, the optical filters according to Examples 22 and 23 had good optical properties. From these results, it can be seen that an optical filter having good optical properties can be produced regardless of the type of halogenated phenylphosphonic acid contained in the light-absorbing composition.

Examples 24 to 49 and Comparative Examples 6 to 10

Figure 18:
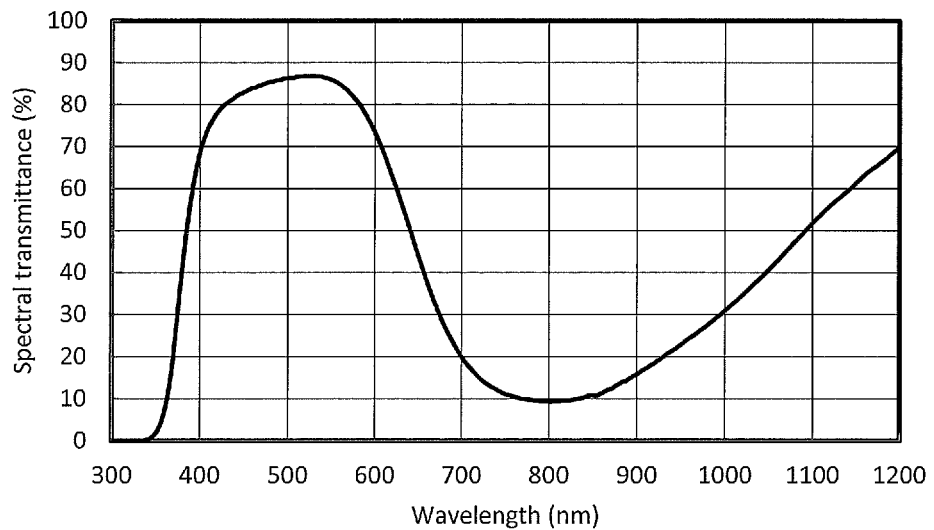
FIG. 18 shows a normalized transmittance spectrum of an optical filter according to Example 24.

The normalized transmittance spectrum of the optical filter according to Example 24 is shown in FIG. 18. Also, optical properties read from the normalized transmittance spectra of the optical filters according to Examples 24 to 49 are shown in Tables 9 and 10. Further, optical properties read from the transmittance spectra or the normalized transmittance spectra of the optical filters according to Comparative Examples 6 to 9 are shown in Table 12. The light-absorbing compositions of Examples 1 to 23 and Comparative Examples 1 to 5 were prepared by adding both a phenyl-based phosphonic acid and an alkyl-based phosphonic acid. In contrast, the light-absorbing compositions according to Examples 24 to 49 and Comparative Examples 6 to 10 were prepared by adding only a phenyl-based phosphonic acid as phosphonic acid. As can be seen from Tables 1 to 6, 9, 10, and 12, it is demonstrated that an optical filter having good optical properties can be produced when the light-absorbing composition contains a predetermined amount of an alkoxysilane monomer having an alkyl group. The light-absorbing composition of Comparative Example 10 was turbid, and a suitable optical filter could not be obtained.

Examples 34 and 35

Figure 19:
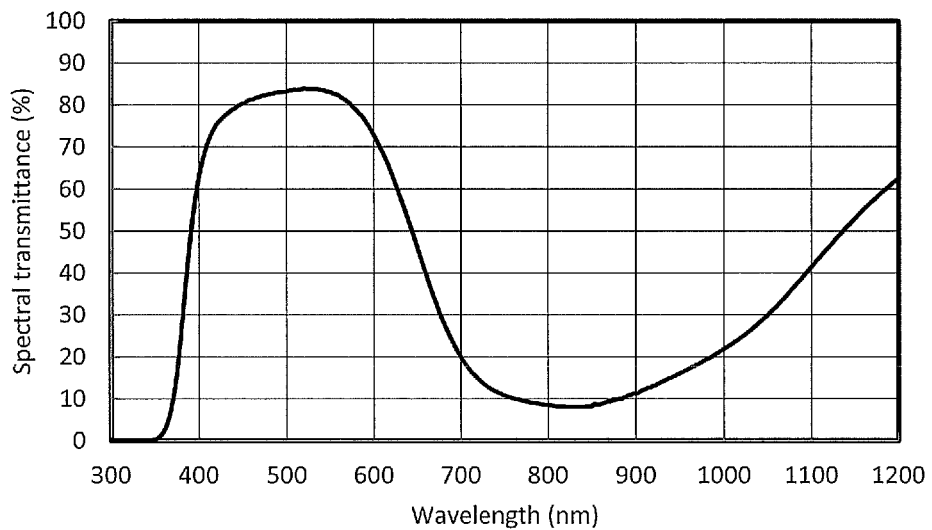
FIG. 19 shows a normalized transmittance spectrum of an optical filter according to Example 34.
Figure 20:
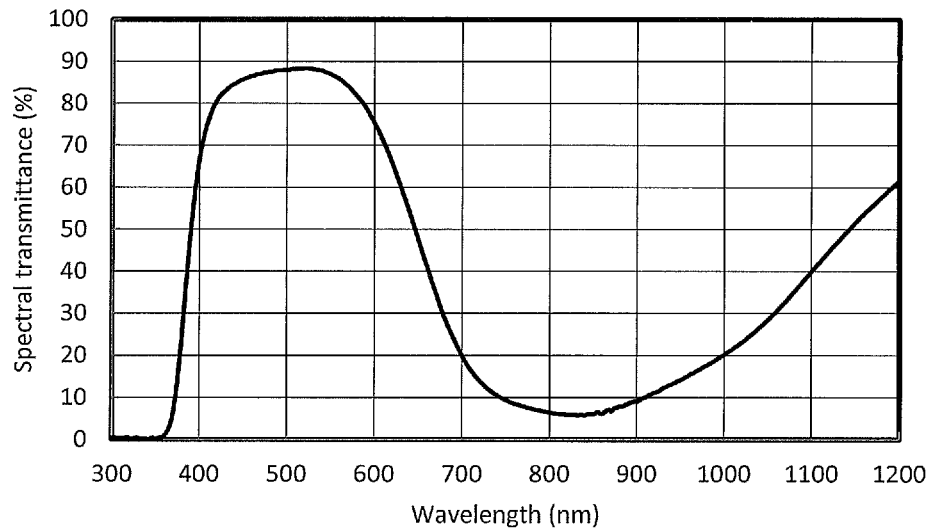
FIG. 20 shows a normalized transmittance spectrum of an optical filter according to Example 35.

The normalized transmittance spectra of the optical filters according to Examples 34 and 35 are shown in FIGS. 19 and 20, respectively. Also, optical properties read from the normalized transmittance spectra of the optical filters according to Examples 34 and 35 are shown in Table 9. As shown in Table 3, the light-absorbing compositions of Examples 34 and 35 were prepared without adding a resin composition containing a silicone resin. From the results obtained regarding Examples 34 and 35, it can be seen that an optical filter having good optical properties can be produced without adding a resin composition containing a silicone resin to the light-absorbing composition. This suggests that a hydrolysis-polycondensation product of the alkoxysilane monomer contained in the light-absorbing composition forms a strong siloxane bond (—Si—O—Si—), which fills gaps between fine particles of the light absorber to play an effective role in forming the light-absorbing layer. Accordingly, it can be seen that adapting the light-absorbing composition to contain an alkoxysilane monomer is advantageous not only in properly dispersing the light absorber but also in forming the skeleton of the light-absorbing layer.

As described above, the optical filter according to Example 35 was constituted only by the light-absorbing layer. From the results obtained regarding Example 35, it can be seen that the light-absorbing composition containing a sufficient amount of alkoxysilane monomer can eliminate the necessity of using a phosphoric acid ester and a silicone resin and also can produce an optical filter that does not require a substrate. In other words, an alkoxysilane monomer alone can play the roles of a phosphate ester, a silicone resin, and a transparent glass substrate.

Examples 50 to 63 and Comparative Examples 11 and 12

Figure 21:
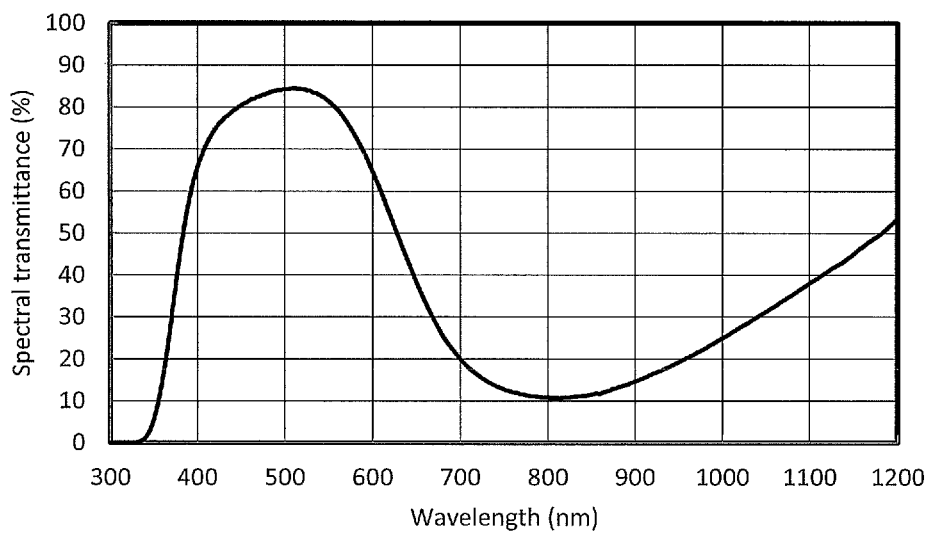
FIG. 21 shows a normalized transmittance spectrum of an optical filter according to Example 50.

The normalized transmittance spectrum of the optical filter according to Example 50 is shown in FIG. 21. Also, optical properties read from the normalized transmittance spectra of the optical filters according to Examples 50 to 63 are shown in Table 11. Further, optical properties read from the normalized transmittance spectrum of the optical filter according to Comparative Example 11 are shown in Table 12. The light-absorbing compositions of Examples 1 to 23 and Comparative Examples 1 to 5 were prepared by adding both a phenyl-based phosphonic acid and an alkyl-based phosphonic acid. In contrast, the light-absorbing compositions according to Examples 50 to 63 and Comparative Examples 11 to 12 were prepared by adding only an alkyl-based phosphonic acid as phosphonic acid. The light-absorbing composition of Comparative Example 12 was whitish, and a suitable optical filter could not be obtained. As can be seen from Tables 3 to 6, 11, and 12, it is demonstrated that an optical filter having good optical properties can be produced when a light-absorbing composition contains a predetermined amount of an alkoxysilane monomer having an alkyl group.

Comparison between Examples 1 to 23 and Comparative Examples 1, 2, and 4 suggests that, in the following case (I), the ratio of the content of a bifunctional or trifunctional alkoxysilane monomer having an alkyl group to the content of copper ion is desirably 2.5 or more on an amount-of-substance basis in order to obtain an optical filter having good optical properties.

(I) The light-absorbing composition contains a phenyl-based phosphonic acid and an alkyl-based phosphonic acid, and also contains a tetrafunctional alkoxysilane monomer and a bifunctional or trifunctional alkoxysilane monomer.

Comparison between Examples 24 to 49 and Comparative Examples 6, 7, 9, and 10 suggests that, in the following case (II), the ratio of the content of a bifunctional or trifunctional alkoxysilane monomer having an alkyl group to the content of copper ion is desirably 2.5 or more on an amount-of-substance basis in order to obtain an optical filter having good optical properties.

(II) The light-absorbing composition contains a phenyl-based phosphonic acid and does not contain an alkyl-based phosphonic acid, and also contains a tetrafunctional alkoxysilane monomer and a bifunctional or trifunctional alkoxysilane monomer.

Comparison between Examples 50 to 63 and Comparative Examples 11 and 12 suggests that, in the following case (III), the ratio of the content of a bifunctional or trifunctional alkoxysilane monomer having an alkyl group to the content of copper ion is desirably 1.5 or more on an amount-of-substance basis in order to obtain an optical filter having good optical properties.

(III) The light-absorbing composition contains an alkyl-based phosphonic acid and does not contain a phenyl-based phosphonic acid, and also contains a tetrafunctional alkoxysilane monomer and a bifunctional or trifunctional alkoxysilane monomer.

TABLE 1

| | Phenyl-based phosphonic acid | | | Alkyl-based phosphonic acid n-butyl phosphonic acid (g) | Copper ion (g) | Alkoxysilane monomer | | | |
|---|---|---|---|---|---|---|---|---|---|
| | Phenyl phosphonic acid (g) | Halogenated phenyl phosphonic acid | | | | | | | |
| | | 4-bromo phenyl phosphonic acid (g) | 4-chloro phenyl phosphonic acid (g) | | | MTES (g) | MTMS (g) | DMDES (g) | TEOS (g) |
| Ex. 1 | 0.447 | 0.670 | 0 | 0.257 | 0.551 | 7.581 | 0 | 0 | 2.485 |
| Ex. 2 | 0.447 | 0.670 | 0 | 0.257 | 0.551 | 4.549 | 0 | 0 | 1.491 |
| Ex. 3 | 0.447 | 0.670 | 0 | 0.257 | 0.551 | 4.549 | 0 | 0 | 1.491 |
| Ex. 4 | 0.447 | 0.670 | 0 | 0.257 | 0.551 | 4.549 | 0 | 0 | 1.491 |
| Ex. 5 | 0.447 | 0.670 | 0 | 0.257 | 0.551 | 4.549 | 0 | 0 | 1.491 |
| Ex. 6 | 0.447 | 0.670 | 0 | 0.257 | 0.551 | 4.549 | 0 | 0 | 1.491 |
| Ex. 7 | 0.447 | 0.670 | 0 | 0.257 | 0.551 | 5.761 | 0 | 0 | 1.889 |
| Ex. 8 | 0.447 | 0.670 | 0 | 0.257 | 0.551 | 10.007 | 0 | 0 | 3.280 |
| Ex. 9 | 0.447 | 0.670 | 0 | 0.257 | 0.551 | 13.646 | 0 | 0 | 4.473 |
| Ex. 10 | 0.447 | 0.670 | 0 | 0.257 | 0.551 | 27.292 | 0 | 0 | 8.946 |
| Ex. 11 | 0.447 | 0.670 | 0 | 0.257 | 0.551 | 0 | 5.799 | 0 | 2.485 |
| Ex. 12 | 0.447 | 0.670 | 0 | 0.257 | 0.551 | 0 | 0 | 5.712 | 2.485 |
| Ex. 13 | 0.447 | 0.670 | 0 | 0.257 | 0.551 | 0 | 0 | 5.712 | 2.485 |
| Ex. 14 | 0.447 | 0.670 | 0 | 0.257 | 0.551 | 9.477 | 0 | 0 | 0 |
| Ex. 15 | 0.447 | 0.670 | 0 | 0.257 | 0.551 | 4.738 | 0 | 0 | 6.213 |
| Ex. 16 | 0.447 | 0.670 | 0 | 0.257 | 0.551 | 5.965 | 0 | 0 | 18.252 |
| Ex. 17 | 0.447 | 0.670 | 0 | 0.257 | 0.551 | 5.965 | 0 | 0 | 18.252 |
| Ex. 18 | 0.894 | 0 | 0 | 0.257 | 0.551 | 7.581 | 0 | 0 | 2.485 |
| Ex. 19 | 0.894 | 0 | 0 | 0.257 | 0.551 | 7.581 | 0 | 0 | 2.485 |
| Ex. 20 | 0.268 | 0.938 | 0 | 0.257 | 0.551 | 7.581 | 0 | 0 | 2.485 |
| Ex. 21 | 0.268 | 0.938 | 0 | 0.257 | 0.551 | 7.581 | 0 | 0 | 2.485 |
| Ex. 22 | 0.447 | 0 | 0.544 | 0.257 | 0.551 | 7.581 | 0 | 0 | 2.485 |

TABLE 1-continued

| | | | | | | | | | |
|---|---|---|---|---|---|---|---|---|---|
| Ex. 23 | 0.447 | 0 | 0.544 | 0.257 | 0.551 | 7.581 | 0 | 0 | 2.485 |
| Ex. 24 | 0.447 | 0.670 | 0 | 0 | 0.394 | 5.415 | 0 | 0 | 1.775 |
| Ex. 25 | 0.447 | 0.670 | 0 | 0 | 0.394 | 3.249 | 0 | 0 | 1.065 |
| Ex. 26 | 0.447 | 0.670 | 0 | 0 | 0.394 | 3.249 | 0 | 0 | 1.065 |
| Ex. 27 | 0.447 | 0.670 | 0 | 0 | 0.394 | 3.249 | 0 | 0 | 1.065 |
| Ex. 28 | 0.447 | 0.670 | 0 | 0 | 0.394 | 3.249 | 0 | 0 | 1.065 |
| Ex. 29 | 0.447 | 0.670 | 0 | 0 | 0.394 | 3.249 | 0 | 0 | 1.065 |
| Ex. 30 | 0.447 | 0.670 | 0 | 0 | 0.394 | 4.115 | 0 | 0 | 1.349 |

| | Alkoxysilane monomer solid content | | | | Silicone resin Resin composition | | | |
|---|---|---|---|---|---|---|---|---|
| | MTES (g) | MTMS (g) | DMDES (g) | TEOS (g) | X (g) | Y (g) | Z (g) | (1) |
| Ex. 1 | 2.854 | 0 | 0 | 0.717 | 0 | 8.800 | 0 | 0.929 |
| Ex. 2 | 1.712 | 0 | 0 | 0.430 | 8.800 | 0 | 0 | 1.255 |
| Ex. 3 | 1.712 | 0 | 0 | 0.430 | 0 | 8.800 | 0 | 1.255 |
| Ex. 4 | 1.712 | 0 | 0 | 0.430 | 0 | 0 | 4.400 | 0.649 |
| Ex. 5 | 1.712 | 0 | 0 | 0.430 | 0 | 0 | 8.800 | 1.298 |
| Ex. 6 | 1.712 | 0 | 0 | 0.430 | 0 | 0 | 13.200 | 1.947 |
| Ex. 7 | 2.169 | 0 | 0 | 0.545 | 0 | 8.800 | 0 | 1.100 |
| Ex. 8 | 3.767 | 0 | 0 | 0.946 | 0 | 8.800 | 0 | 0.769 |
| Ex. 9 | 5.137 | 0 | 0 | 1.290 | 0 | 8.800 | 0 | 0.611 |
| Ex. 10 | 10.274 | 0 | 0 | 2.580 | 0 | 8.800 | 0 | 0.345 |
| Ex. 11 | 0 | 2.857 | 0 | 0.717 | 0 | 8.800 | 0 | 0.928 |
| Ex. 12 | 0 | 0 | 2.857 | 0.717 | 8.800 | 0 | 0 | 0.928 |
| Ex. 13 | 0 | 0 | 2.857 | 0.717 | 0 | 8.800 | 0 | 0.928 |
| Ex. 14 | 3.567 | 0 | 0 | 0 | 0 | 8.800 | 0 | 0.929 |
| Ex. 15 | 1.784 | 0 | 0 | 1.792 | 0 | 8.800 | 0 | 0.928 |
| Ex. 16 | 2.245 | 0 | 0 | 5.264 | 8.800 | 0 | 0 | 0.541 |
| Ex. 17 | 2.245 | 0 | 0 | 5.264 | 0 | 8.800 | 0 | 0.541 |
| Ex. 18 | 2.854 | 0 | 0 | 0.717 | 8.800 | 0 | 0 | 0.968 |
| Ex. 19 | 2.854 | 0 | 0 | 0.717 | 0 | 8.800 | 0 | 0.968 |
| Ex. 20 | 2.854 | 0 | 0 | 0.717 | 8.800 | 0 | 0 | 0.914 |
| Ex. 21 | 2.854 | 0 | 0 | 0.717 | 0 | 8.800 | 0 | 0.914 |
| Ex. 22 | 2.854 | 0 | 0 | 0.717 | 8.800 | 0 | 0 | 1.058 |
| Ex. 23 | 2.854 | 0 | 0 | 0.717 | 0 | 8.800 | 0 | 1.058 |
| Ex. 24 | 2.038 | 0 | 0 | 0.512 | 0 | 8.800 | 0 | 1.257 |
| Ex. 25 | 1.223 | 0 | 0 | 0.307 | 8.800 | 0 | 0 | 1.679 |
| Ex. 26 | 1.223 | 0 | 0 | 0.307 | 0 | 8.800 | 0 | 1.679 |
| Ex. 27 | 1.223 | 0 | 0 | 0.307 | 0 | 0 | 4.400 | 0.868 |
| Ex. 28 | 1.223 | 0 | 0 | 0.307 | 0 | 0 | 8.800 | 1.736 |
| Ex. 29 | 1.223 | 0 | 0 | 0.307 | 0 | 0 | 13.200 | 2.605 |
| Ex. 30 | 1.549 | 0 | 0 | 0.389 | 0 | 8.800 | 0 | 1.480 |

TABLE 2

| | Phenyl-based phosphonic acid | | | Alkyl-based | | |
|---|---|---|---|---|---|---|
| | | Halogenated phenyl phosphonic acid | | | | |
| | Phenyl phosphonic acid ($\times 10^{-3}$ mol) | 4-bromo phenyl phosphonic acid ($\times 10^{-3}$ mol) | 4-chloro phenyl phosphonic acid ($\times 10^{-3}$ mol) | phosphonic acid n-butyl phosphonic acid ($\times 10^{-3}$ mol) | Copper Ion ($\times 10^{-3}$ mol) | Alkoxysilane monomer MTES ($\times 10^{-3}$ mol) |
| Ex. 1 | 2.828 | 2.827 | 0 | 1.863 | 8.671 | 42.518 |
| Ex. 2 | 2.828 | 2.827 | 0 | 1.863 | 8.671 | 25.513 |
| Ex. 3 | 2.828 | 2.827 | 0 | 1.863 | 8.671 | 25.513 |
| Ex. 4 | 2.828 | 2.827 | 0 | 1.863 | 8.671 | 25.513 |
| Ex. 5 | 2.828 | 2.827 | 0 | 1.863 | 8.671 | 25.513 |
| Ex. 6 | 2.828 | 2.827 | 0 | 1.863 | 8.671 | 25.513 |
| Ex. 7 | 2.828 | 2.827 | 0 | 1.863 | 8.671 | 32.311 |
| Ex. 8 | 2.828 | 2.827 | 0 | 1.863 | 8.671 | 56.124 |
| Ex. 9 | 2.828 | 2.827 | 0 | 1.863 | 8.671 | 76.534 |
| Ex. 10 | 2.828 | 2.827 | 0 | 1.863 | 8.671 | 153.067 |
| Ex. 11 | 2.828 | 2.827 | 0 | 1.863 | 8.671 | 0 |
| Ex. 12 | 2.828 | 2.827 | 0 | 1.863 | 8.671 | 0 |
| Ex. 13 | 2.828 | 2.827 | 0 | 1.863 | 8.671 | 0 |
| Ex. 14 | 2.828 | 2.827 | 0 | 1.863 | 8.671 | 53.152 |
| Ex. 15 | 2.828 | 2.827 | 0 | 1.863 | 8.671 | 26.573 |

TABLE 2-continued

| | | | | | | |
|---|---|---|---|---|---|---|
| Ex. 16 | 2.828 | 2.827 | 0 | 1.863 | 8.671 | 33.455 |
| Ex. 17 | 2.828 | 2.827 | 0 | 1.863 | 8.671 | 33.455 |
| Ex. 18 | 5.655 | 0 | 0 | 1.863 | 8.671 | 42.518 |
| Ex. 19 | 5.655 | 0 | 0 | 1.863 | 8.671 | 42.518 |
| Ex. 20 | 1.695 | 3.958 | 0 | 1.863 | 8.671 | 42.518 |
| Ex. 21 | 1.695 | 3.958 | 0 | 1.863 | 8.671 | 42.518 |
| Ex. 22 | 2.828 | 0 | 2.825 | 1.863 | 8.671 | 42.518 |
| Ex. 23 | 2.828 | 0 | 2.825 | 1.863 | 8.671 | 42.518 |
| Ex. 24 | 2.828 | 2.827 | 0 | 0 | 6.194 | 30.370 |
| Ex. 25 | 2.828 | 2.827 | 0 | 0 | 6.194 | 18.222 |
| Ex. 26 | 2.828 | 2.827 | 0 | 0 | 6.194 | 18.222 |
| Ex. 27 | 2.828 | 2.827 | 0 | 0 | 6.194 | 18.222 |
| Ex. 28 | 2.828 | 2.827 | 0 | 0 | 6.194 | 18.222 |
| Ex. 29 | 2.828 | 2.827 | 0 | 0 | 6.194 | 18.222 |
| Ex. 30 | 2.828 | 2.827 | 0 | 0 | 6.194 | 23.079 |

| | Alkoxysilane monomer | | | Amount-of-substance ratio of alkoxysilane monomer to copper ion | Amount-of-substance ratio of trifunctional and bifunctional alkoxysilane monomer to copper ion |
|---|---|---|---|---|---|
| | MTMS ($\times 10^{-3}$ mol) | DMDES ($\times 10^{-3}$ mol) | TEOS ($\times 10^{-3}$ mol) | | |
| Ex. 1 | 0 | 0 | 11.928 | 6.279 | 4.903 |
| Ex. 2 | 0 | 0 | 7.157 | 3.768 | 2.942 |
| Ex. 3 | 0 | 0 | 7.157 | 3.768 | 2.942 |
| Ex. 4 | 0 | 0 | 7.157 | 3.768 | 2.942 |
| Ex. 5 | 0 | 0 | 7.157 | 3.768 | 2.942 |
| Ex. 6 | 0 | 0 | 7.157 | 3.768 | 2.942 |
| Ex. 7 | 0 | 0 | 9.067 | 4.772 | 3.726 |
| Ex. 8 | 0 | 0 | 15.745 | 8.288 | 6.472 |
| Ex. 9 | 0 | 0 | 21.471 | 11.302 | 8.826 |
| Ex. 10 | 0 | 0 | 42.942 | 22.604 | 17.652 |
| Ex. 11 | 42.570 | 0 | 11.928 | 6.285 | 4.909 |
| Ex. 12 | 0 | 38.523 | 11.928 | 5.818 | 4.443 |
| Ex. 13 | 0 | 38.523 | 11.928 | 5.818 | 4.443 |
| Ex. 14 | 0 | 0 | 0 | 6.129 | 6.129 |
| Ex. 15 | 0 | 0 | 29.823 | 6.504 | 3.064 |
| Ex. 16 | 0 | 0 | 87.612 | 13.962 | 3.858 |
| Ex. 17 | 0 | 0 | 87.612 | 13.962 | 3.858 |
| Ex. 18 | 0 | 0 | 11.928 | 6.279 | 4.903 |
| Ex. 19 | 0 | 0 | 11.928 | 6.279 | 4.903 |
| Ex. 20 | 0 | 0 | 11.928 | 6.279 | 4.903 |
| Ex. 21 | 0 | 0 | 11.928 | 6.279 | 4.903 |
| Ex. 22 | 0 | 0 | 11.928 | 6.279 | 4.903 |
| Ex. 23 | 0 | 0 | 11.928 | 6.279 | 4.903 |
| Ex. 24 | 0 | 0 | 8.520 | 6.279 | 4.903 |
| Ex. 25 | 0 | 0 | 5.112 | 3.767 | 2.942 |
| Ex. 26 | 0 | 0 | 5.112 | 3.767 | 2.942 |
| Ex. 27 | 0 | 0 | 5.112 | 3.767 | 2.942 |
| Ex. 28 | 0 | 0 | 5.112 | 3.767 | 2.942 |
| Ex. 29 | 0 | 0 | 5.112 | 3.767 | 2.942 |
| Ex. 30 | 0 | 0 | 6.475 | 4.772 | 3.726 |

TABLE 3

| | Phenyl-based phosphonic acid | | | Alkyl-based phosphonic acid | | Alkoxysilane monomer | | | |
|---|---|---|---|---|---|---|---|---|---|
| | Phenyl phosphonic acid (g) | 4-bromo phenyl phosphonic acid (g) | 4-chloro phenyl phosphonic acid (g) | n-butyl phosphonic acid (g) | Copper ion (g) | MTES (g) | MTMS (g) | DMDES (g) | TEOS (g) |
| Ex. 31 | 0.447 | 0.670 | 0 | 0 | 0.394 | 7.148 | 0 | 0 | 2.343 |
| Ex. 32 | 0.447 | 0.670 | 0 | 0 | 0.394 | 9.747 | 0 | 0 | 3.195 |
| Ex. 33 | 0.447 | 0.670 | 0 | 0 | 0.394 | 19.494 | 0 | 0 | 6.390 |
| Ex. 34 | 0.447 | 0.670 | 0 | 0 | 0.394 | 19.494 | 0 | 0 | 6.390 |
| Ex. 35 | 0.447 | 0.670 | 0 | 0 | 0.394 | 19.494 | 0 | 0 | 6.390 |
| Ex. 36 | 0.447 | 0.670 | 0 | 0 | 0.394 | 0 | 4.142 | 0 | 1.775 |
| Ex. 37 | 0.447 | 0.670 | 0 | 0 | 0.394 | 0 | 4.142 | 0 | 1.775 |
| Ex. 38 | 0.447 | 0.670 | 0 | 0 | 0.394 | 0 | 0 | 4.080 | 1.775 |
| Ex. 39 | 0.447 | 0.670 | 0 | 0 | 0.394 | 0 | 0 | 4.080 | 1.775 |
| Ex. 40 | 0.447 | 0.670 | 0 | 0 | 0.394 | 6.769 | 0 | 0 | 0 |
| Ex. 41 | 0.447 | 0.670 | 0 | 0 | 0.394 | 3.384 | 0 | 0 | 1.438 |
| Ex. 42 | 0.447 | 0.670 | 0 | 0 | 0.394 | 4.261 | 0 | 0 | 13.037 |
| Ex. 43 | 0.447 | 0.670 | 0 | 0 | 0.394 | 4.261 | 0 | 0 | 13.037 |
| Ex. 44 | 0.894 | 0 | 0 | 0 | 0.394 | 5.415 | 0 | 0 | 1.775 |
| Ex. 45 | 0.894 | 0 | 0 | 0 | 0.394 | 5.415 | 0 | 0 | 1.775 |
| Ex. 46 | 0.268 | 0.938 | 0 | 0 | 0.394 | 5.415 | 0 | 0 | 1.775 |
| Ex. 47 | 0.268 | 0.938 | 0 | 0 | 0.394 | 5.415 | 0 | 0 | 1.775 |
| Ex. 48 | 0.447 | 0 | 0.544 | 0 | 0.394 | 5.415 | 0 | 0 | 1.775 |
| Ex. 49 | 0.447 | 0 | 0.544 | 0 | 0.394 | 5.415 | 0 | 0 | 1.775 |
| Ex. 50 | 0 | 0 | 0 | 0.643 | 0.394 | 5.415 | 0 | 0 | 1.775 |
| Ex. 51 | 0 | 0 | 0 | 0.643 | 0.394 | 5.415 | 0 | 0 | 1.775 |
| Ex. 52 | 0 | 0 | 0 | 0.643 | 0.394 | 3.249 | 0 | 0 | 1.065 |
| Ex. 53 | 0 | 0 | 0 | 0.643 | 0.394 | 4.115 | 0 | 0 | 1.349 |
| Ex. 54 | 0 | 0 | 0 | 0.643 | 0.394 | 7.148 | 0 | 0 | 2.343 |
| Ex. 55 | 0 | 0 | 0 | 0.643 | 0.394 | 9.747 | 0 | 0 | 3.195 |
| Ex. 56 | 0 | 0 | 0 | 0.643 | 0.394 | 19.494 | 0 | 0 | 6.390 |
| Ex. 57 | 0 | 0 | 0 | 0.643 | 0.394 | 2.978 | 0 | 0 | 0 |
| Ex. 58 | 0 | 0 | 0 | 0.643 | 0.394 | 6.769 | 0 | 0 | 0 |
| Ex. 59 | 0 | 0 | 0 | 0.643 | 0.394 | 6.769 | 0 | 0 | 0 |
| Ex. 60 | 0 | 0 | 0 | 0.643 | 0.394 | 2.031 | 0 | 0 | 2.663 |
| Ex. 61 | 0 | 0 | 0 | 0.643 | 0.394 | 3.384 | 0 | 0 | 4.438 |
| Ex. 62 | 0 | 0 | 0 | 0.643 | 0.394 | 4.261 | 0 | 0 | 13.037 |
| Ex. 63 | 0 | 0 | 0 | 0.643 | 0.394 | 4.261 | 0 | 0 | 13.037 |

| | Alkoxysilane monomer solid content | | | | Silicone resin Resin composition | | | |
|---|---|---|---|---|---|---|---|---|
| | MTES (g) | MTMS (g) | DMDES (g) | TEOS (g) | X (g) | Y (g) | Z (g) | (1) |
| Ex. 31 | 2.691 | 0 | 0 | 0.676 | 0 | 8.800 | 0 | 1.047 |
| Ex. 32 | 3.669 | 0 | 0 | 0.921 | 0 | 8.800 | 0 | 0.837 |
| Ex. 33 | 7.338 | 0 | 0 | 1.843 | 0 | 8.800 | 0 | 0.477 |
| Ex. 34 | 7.338 | 0 | 0 | 1.843 | 0 | 0 | 0 | 0.000 |
| Ex. 35 | 7.338 | 0 | 0 | 1.843 | 0 | 0 | 0 | 0.000 |
| Ex. 36 | 0 | 2.041 | 0 | 0.512 | 8.800 | 0 | 0 | 1.256 |
| Ex. 37 | 0 | 2.041 | 0 | 0.512 | 0 | 8.800 | 0 | 1.256 |
| Ex. 38 | 0 | 0 | 2.040 | 0.512 | 8.800 | 0 | 0 | 1.256 |
| Ex. 39 | 0 | 0 | 2.040 | 0.512 | 0 | 8.800 | 0 | 1.256 |
| Ex. 40 | 2.548 | 0 | 0 | 0.000 | 0 | 8.800 | 0 | 1.258 |
| Ex. 41 | 1.274 | 0 | 0 | 1.280 | 0 | 8.800 | 0 | 1.256 |
| Ex. 42 | 1.604 | 0 | 0 | 3.760 | 8.800 | 0 | 0 | 0.742 |
| Ex. 43 | 1.604 | 0 | 0 | 3.760 | 0 | 8.800 | 0 | 0.742 |
| Ex. 44 | 2.038 | 0 | 0 | 0.512 | 8.800 | 0 | 0 | 1.330 |
| Ex. 45 | 2.038 | 0 | 0 | 0.512 | 0 | 8.800 | 0 | 1.330 |
| Ex. 46 | 2.038 | 0 | 0 | 0.512 | 8.800 | 0 | 0 | 1.230 |
| Ex. 47 | 2.038 | 0 | 0 | 0.512 | 0 | 8.800 | 0 | 1.230 |
| Ex. 48 | 2.038 | 0 | 0 | 0.512 | 8.800 | 0 | 0 | 1.505 |
| Ex. 49 | 2.038 | 0 | 0 | 0.512 | 0 | 8.800 | 0 | 1.505 |
| Ex. 50 | 2.038 | 0 | 0 | 0.512 | 8.800 | 0 | 0 | 1.423 |
| Ex. 51 | 2.038 | 0 | 0 | 0.512 | 0 | 8.800 | 0 | 1.423 |
| Ex. 52 | 1.223 | 0 | 0 | 0.307 | 8.800 | 0 | 0 | 1.988 |
| Ex. 53 | 1.549 | 0 | 0 | 0.389 | 8.800 | 0 | 0 | 1.716 |
| Ex. 54 | 2.691 | 0 | 0 | 0.676 | 0 | 8.800 | 0 | 1.159 |

TABLE 3-continued

|  | | | | | | | | |
|---|---|---|---|---|---|---|---|---|
| Ex. 55 | 3.669 | 0 | 0 | 0.921 | 0 | 8.800 | 0 | 0.907 |
| Ex. 56 | 7.338 | 0 | 0 | 1.843 | 8.800 | 0 | 0 | 0.500 |
| Ex. 57 | 1.121 | 0 | 0 | 0 | 8.800 | 0 | 0 | 2.366 |
| Ex. 58 | 2.548 | 0 | 0 | 0 | 8.800 | 0 | 0 | 1.424 |
| Ex. 59 | 2.548 | 0 | 0 | 0 | 0 | 8.800 | 0 | 1.424 |
| Ex. 60 | 0.765 | 0 | 0 | 0.768 | 8.800 | 0 | 0 | 1.987 |
| Ex. 61 | 1.274 | 0 | 0 | 1.280 | 8.800 | 0 | 0 | 1.422 |
| Ex. 62 | 1.604 | 0 | 0 | 3.760 | 8.800 | 0 | 0 | 0.797 |
| Ex. 63 | 1.604 | 0 | 0 | 3.760 | 0 | 8.800 | 0 | 0.797 |

(1) Mass ratio of resin composition (solid content) to sum of phosphonic acid, copper ion, and alkoxysilane monomer as expressed in terms of hydrolysis-polycondensation product

TABLE 4

| | Phenyl-based phosphonic acid | | | Alkyl-based phosphonic acid | | | | | | | |
|---|---|---|---|---|---|---|---|---|---|---|---|
| | | Halogenated phenyl phosphonic acid | | | | | | | | Amount-of-substance ratio of alkoxysilane | Amount-of-substance ratio of trifunctional and bifunctional |
| | Phenyl phosphonic acid ($\times 10^{-3}$ mol) | 4-bromo-phenyl phosphonic acid ($\times 10^{-3}$ mol) | 4-chloro-phenyl phosphonic acid ($\times 10^{-3}$ mol) | n-butyl phosphonic acid ($\times 10^{-3}$ mol) | Copper Ion ($\times 10^{-3}$ mol) | MTES ($\times 10^{-3}$ mol) | MTMS ($\times 10^{-3}$ mol) | DMDES ($\times 10^{-3}$ mol) | TEOS ($\times 10^{-3}$ mol) | monomer to copper ion | alkoxysilane monomer to copper ion |
| Ex. 31 | 2.828 | 2.827 | 0 | 0 | 6.194 | 40.090 | 0 | 0 | 11.247 | 8.288 | 6.472 |
| Ex. 32 | 2.828 | 2.827 | 0 | 0 | 6.194 | 54.666 | 0 | 0 | 15.336 | 11.302 | 8.826 |
| Ex. 33 | 2.828 | 2.827 | 0 | 0 | 6.194 | 109.332 | 0 | 0 | 30.673 | 22.604 | 17.652 |
| Ex. 34 | 2.828 | 2.827 | 0 | 0 | 6.194 | 109.332 | 0 | 0 | 30.673 | 22.604 | 17.652 |
| Ex. 35 | 2.828 | 2.827 | 0 | 0 | 6.194 | 109.332 | 0 | 0 | 30.673 | 22.604 | 17.652 |
| Ex. 36 | 2.828 | 2.827 | 0 | 0 | 6.194 | 0 | 30.406 | 0 | 8.520 | 6.285 | 4.909 |
| Ex. 37 | 2.828 | 2.827 | 0 | 0 | 6.194 | 0 | 30.406 | 0 | 8.520 | 6.285 | 4.909 |
| Ex. 38 | 2.828 | 2.827 | 0 | 0 | 6.194 | 0 | 0 | 27.516 | 8.520 | 5.818 | 4.443 |
| Ex. 39 | 2.828 | 2.827 | 0 | 0 | 6.194 | 0 | 0 | 27.516 | 8.520 | 5.818 | 4.443 |
| Ex. 40 | 2.828 | 2.827 | 0 | 0 | 6.194 | 37.964 | 0 | 0 | 0 | 6.129 | 6.129 |
| Ex. 41 | 2.828 | 2.827 | 0 | 0 | 6.194 | 18.979 | 0 | 0 | 21.303 | 6.504 | 3.064 |
| Ex. 42 | 2.828 | 2.827 | 0 | 0 | 6.194 | 23.898 | 0 | 0 | 62.580 | 13.962 | 3.858 |
| Ex. 43 | 2.828 | 2.827 | 0 | 0 | 6.194 | 23.898 | 0 | 0 | 62.580 | 13.962 | 3.858 |
| Ex. 44 | 5.655 | 0 | 0 | 0 | 6.194 | 30.370 | 0 | 0 | 8.520 | 6.279 | 4.903 |
| Ex. 45 | 5.655 | 0 | 0 | 0 | 6.194 | 30.370 | 0 | 0 | 8.520 | 6.279 | 4.903 |
| Ex. 46 | 1.695 | 3.958 | 0 | 0 | 6.194 | 30.370 | 0 | 0 | 8.520 | 6.279 | 4.903 |
| Ex. 47 | 1.695 | 3.958 | 0 | 0 | 6.194 | 30.370 | 0 | 0 | 8.520 | 6.279 | 4.903 |
| Ex. 48 | 2.828 | 0 | 2.825 | 0 | 6.194 | 30.370 | 0 | 0 | 8.520 | 6.279 | 4.903 |
| Ex. 49 | 2.828 | 0 | 2.825 | 0 | 6.194 | 30.370 | 0 | 0 | 8.520 | 6.279 | 4.903 |
| Ex. 50 | 0 | 0 | 0 | 4.660 | 6.194 | 30.370 | 0 | 0 | 8.520 | 6.279 | 4.903 |
| Ex. 51 | 0 | 0 | 0 | 4.660 | 6.194 | 30.370 | 0 | 0 | 8.520 | 6.279 | 4.903 |
| Ex. 52 | 0 | 0 | 0 | 4.660 | 6.194 | 18.222 | 0 | 0 | 5.112 | 3.767 | 2.942 |
| Ex. 53 | 0 | 0 | 0 | 4.660 | 6.194 | 23.079 | 0 | 0 | 6.475 | 1.772 | 3.726 |
| Ex. 54 | 0 | 0 | 0 | 4.660 | 6.194 | 40.090 | 0 | 0 | 11.247 | 8.288 | 6.472 |
| Ex. 55 | 0 | 0 | 0 | 4.660 | 6.194 | 54.666 | 0 | 0 | 15.336 | 11.302 | 8.826 |
| Ex. 56 | 0 | 0 | 0 | 4.660 | 6.194 | 109.332 | 0 | 0 | 30.673 | 22.604 | 17.652 |
| Ex. 57 | 0 | 0 | 0 | 4.660 | 6.194 | 16.702 | 0 | 0 | 0 | 2.697 | 2.697 |
| Ex. 58 | 0 | 0 | 0 | 4.660 | 6.194 | 37.964 | 0 | 0 | 0 | 6.129 | 6.129 |
| Ex. 59 | 0 | 0 | 0 | 4.660 | 6.194 | 37.964 | 0 | 0 | 0 | 6.129 | 6.129 |
| Ex. 60 | 0 | 0 | 0 | 4.660 | 6.194 | 11.391 | 0 | 0 | 12.783 | 3.903 | 1.839 |
| Ex. 61 | 0 | 0 | 0 | 4.660 | 6.194 | 18.979 | 0 | 0 | 21.303 | 6.504 | 3.064 |
| Ex. 62 | 0 | 0 | 0 | 4.660 | 6.194 | 23.898 | 0 | 0 | 62.580 | 13.962 | 3.858 |
| Ex. 63 | 0 | 0 | 0 | 4.660 | 6.194 | 23.898 | 0 | 0 | 62.580 | 13.962 | 3.858 |

TABLE 5

| | Phenyl-based phosphonic acid | | | Alkyl-based phosphonic acid | | Alkoxysilane monomer | | | |
|---|---|---|---|---|---|---|---|---|---|
| | Phenyl phosphonic acid (g) | 4-bromo phenyl phosphonic acid (g) | 4-chlor phenyl phosphonic acid (g) | n-butyl phosphonic acid (g) | Copper ion (g) | MTES (g) | MTMS (g) | DMDES (g) | TEOS (g) |
| Comp. Ex. 1 | 0.447 | 0.670 | 0 | 0.257 | 0.551 | 1.516 | 0 | 0 | 0.497 |
| Comp. Ex. 2 | 0.447 | 0.670 | 0 | 0.257 | 0.551 | 3.336 | 0 | 0 | 1.093 |
| Comp. Ex. 3 | 0.447 | 0.670 | 0 | 0.257 | 0.551 | 4.169 | 0 | 0 | 0 |
| Comp. Ex. 4 | 0.447 | 0.670 | 0 | 0.257 | 0.551 | 2.843 | 0 | 0 | 3.728 |
| Comp. Ex. 5 | 0.447 | 0.670 | 0 | 0.257 | 0.551 | 0 | 0 | 0 | 12.425 |
| Comp. Ex. 6 | 0.447 | 0.670 | 0 | 0 | 0.394 | 1.083 | 0 | 0 | 0.355 |
| Comp. Ex. 7 | 0.447 | 0.670 | 0 | 0 | 0.394 | 2.383 | 0 | 0 | 0.781 |
| Comp. Ex. 8 | 0.447 | 0.670 | 0 | 0 | 0.394 | 2.978 | 0 | 0 | 0 |
| Comp. Ex. 9 | 0.447 | 0.670 | 0 | 0 | 0.394 | 2.031 | 0 | 0 | 2.663 |
| Comp. Ex. 10 | 0.447 | 0.670 | 0 | 0 | 0.394 | 0 | 0 | 0 | 8.875 |
| Comp. Ex. 11 | 0 | 0 | 0 | 0.643 | 0.394 | 1.083 | 0 | 0 | 0.355 |
| Comp. Ex. 12 | 0 | 0 | 0 | 0.643 | 0.394 | 0 | 0 | 0 | 8.875 |

| | Alkoxysilane monomer solid content | | | | Silicone resin Resin composition | | | |
|---|---|---|---|---|---|---|---|---|
| | MTES (g) | MTMS (g) | DMDES (g) | TEOS (g) | X (g) | Y (g) | Z (g) | (1) |
| Comp. Ex. 1 | 0.571 | 0 | 0 | 0.143 | 0 | 8.800 | 0 | 1.934 |
| Comp. Ex. 2 | 1.256 | 0 | 0 | 0.315 | 0 | 8.800 | 0 | 1.460 |
| Comp. Ex. 3 | 1.569 | 0 | 0 | 0 | 0 | 8.800 | 0 | 1.461 |
| Comp. Ex. 4 | 1.070 | 0 | 0 | 1.075 | 0 | 8.800 | 0 | 1.254 |
| Comp. Ex. 5 | 0 | 0 | 0 | 3.584 | 0 | 0 | 0 | 0.000 |
| Comp. Ex. 6 | 0.408 | 0 | 0 | 0.102 | 0 | 8.800 | 0 | 2.526 |
| Comp. Ex. 7 | 0.897 | 0 | 0 | 0.225 | 0 | 8.800 | 0 | 1.939 |
| Comp. Ex. 8 | 1.121 | 0 | 0 | 0 | 0 | 8.800 | 0 | 1.939 |
| Comp. Ex. 9 | 0.765 | 0 | 0 | 0.768 | 0 | 8.800 | 0 | 1.677 |
| Comp. Ex. 10 | 0 | 0 | 0 | 2.560 | 0 | 0 | 0 | 0.000 |
| Comp. Ex. 11 | 0.408 | 0 | 0 | 0.102 | 8.800 | 0 | 0 | 0.000 |
| Comp. Ex. 12 | 0 | 0 | 0 | 2.560 | 0 | 0 | 0 | 0.000 |

(1) Mass ratio of resin composition (solid content) to sum of phosphonic acid, copper ion, and alkoxysilane monomer as expressed in terms of hydrolysis-polycondensation product

TABLE 6

| | Phenyl-based phosphonic acid | | | | | | | | | | |
|---|---|---|---|---|---|---|---|---|---|---|---|
| | | Halogenated phenyl phosphonic acid | | Alkyl-based phosphonic | | | | | | | Amount-of-substance ratio of |
| | | | | | | | | | | Amount-of-substance ratio of alkoxysilane | trifunctional and bifunctional |
| | Phenyl phosphonic acid ($\times 10^{-3}$ mol) | 4-bromo phenyl phosphonic acid ($\times 10^{-3}$ mol) | 4-chloro phenyl phosphonic acid ($\times 10^{-3}$ mol) | acid n-butyl phosphonic acid ($\times 10^{-3}$ mol) | Copper Ion ($\times 10^{-3}$ mol) | Alkoxysilane monomer | | | | monomer to copper ion | alkoxysilane monomer to copper ion |
| | | | | | | MTES ($\times 10^{-3}$ mol) | MTMS ($\times 10^{-3}$ mol) | DMDES ($\times 10^{-3}$ mol) | TEOS ($\times 10^{-3}$ mol) | | |
| Comp. Ex. 1 | 2.828 | 2.827 | 0 | 1.863 | 8.671 | 8.502 | 0 | 0 | 2.386 | 1.256 | 0.981 |
| Comp. Ex. 2 | 2.828 | 2.827 | 0 | 1.863 | 8.671 | 18.710 | 0 | 0 | 5.247 | 2.763 | 2.158 |
| Comp. Ex. 3 | 2.828 | 2.827 | 0 | 1.863 | 8.671 | 23.382 | 0 | 0 | 0 | 2.696 | 2.696 |
| Comp. Ex. 4 | 2.828 | 2.827 | 0 | 1.863 | 8.671 | 15.945 | 0 | 0 | 17.895 | 3.902 | 1.839 |
| Comp. Ex. 5 | 2.828 | 2.827 | 0 | 1.863 | 8.671 | 0 | 0 | 0 | 59.642 | 6.878 | 0 |
| Comp. Ex. 6 | 2.828 | 2.827 | 0 | 0 | 6.194 | 6.074 | 0 | 0 | 1.704 | 1.256 | 0.981 |
| Comp. Ex. 7 | 2.828 | 2.827 | 0 | 0 | 6.194 | 13.365 | 0 | 0 | 3.749 | 2.763 | 2.158 |
| Comp. Ex. 8 | 2.828 | 2.827 | 0 | 0 | 6.194 | 16.702 | 0 | 0 | 0 | 2.697 | 2.697 |
| Comp. Ex. 9 | 2.828 | 2.827 | 0 | 0 | 6.194 | 11.391 | 0 | 0 | 12.783 | 3.903 | 1.839 |
| Comp. Ex. 10 | 2.828 | 2.827 | 0 | 0 | 6.194 | 0 | 0 | 0 | 42.601 | 6.878 | 0 |
| Comp. Ex. 11 | 0 | 0 | 0 | 4.660 | 6.194 | 6.074 | 0 | 0 | 1.704 | 1.256 | 0.981 |
| Comp. Ex. 12 | 0 | 0 | 0 | 4.660 | 6.194 | 0 | 0 | 0 | 42.601 | 6.878 | 0 |

TABLE 7

| | Calculated thickness (μm) | Wavelength range in which transmittance is 70% or more | | | Wavelength range in which transmittance is 80% or more | | | Wavelength range in which transmittance is 20% or less within wavelength range from 700 to 1200 nm | | |
|---|---|---|---|---|---|---|---|---|---|---|
| | | Minimum wavelength (nm) | Maximum wavelength (nm) | Range*1 (nm) | Minimum wavelength (nm) | Maximum wavelength (nm) | Range*1 (nm) | Minimum wavelength (nm) | Maximum wavelength (nm) | Range*1 (nm) |
| Ex. 1 | 156 | 403 | 597 | 194 | 437 | 571 | 134 | 700 | 952 | 252 |
| Ex. 2 | 216 | 414 | 593 | 179 | 457 | 564 | 107 | 700 | 1015 | 315 |
| Ex. 3 | 162 | 410 | 595 | 185 | 456 | 564 | 108 | 700 | 1004 | 304 |
| Ex. 4 | 93 | 392 | 596 | 204 | 432 | 567 | 135 | 700 | 867 | 167 |
| Ex. 5 | 99 | 397 | 593 | 196 | 448 | 562 | 114 | 700 | 845 | 145 |
| Ex. 6 | 112 | 398 | 596 | 198 | 437 | 568 | 131 | 700 | 849 | 149 |
| Ex. 7 | 187 | 406 | 598 | 192 | 444 | 571 | 127 | 700 | 1018 | 318 |
| Ex. 8 | 167 | 404 | 597 | 193 | 435 | 571 | 136 | 700 | 971 | 271 |
| Ex. 9 | 175 | 408 | 596 | 188 | 452 | 566 | 114 | 700 | 1032 | 332 |
| Ex. 10 | 212 | 411 | 591 | 180 | 447 | 561 | 114 | 700 | 987 | 287 |

| | $\lambda_{UV}$*2 (nm) | $\lambda_{IR}$*3 (nm) | $\lambda_{IR}$-$\lambda_{UV}$ (nm) | Maximum transmittance T*4max (%) | $\lambda$*5max (nm) | Minimum transmittance in wavelength range from 700 to 1200 nm T*4min (%) | $\lambda$*5min (nm) | $\lambda$min-$\lambda$max (nm) | Tmax-Tmin (%) |
|---|---|---|---|---|---|---|---|---|---|
| Ex. 1 | 384 | 633 | 249 | 86.0 | 519 | 9.6 | 807 | 288 | 76.4 |
| Ex. 2 | 389 | 631 | 242 | 85.0 | 518 | 8.0 | 830 | 312 | 77.0 |
| Ex. 3 | 387 | 632 | 245 | 84.2 | 518 | 7.9 | 851 | 333 | 76.3 |
| Ex. 4 | 370 | 632 | 262 | 84.0 | 522 | 12.7 | 775 | 253 | 71.2 |
| Ex. 5 | 368 | 629 | 261 | 83.5 | 517 | 14.1 | 773 | 256 | 69.4 |
| Ex. 6 | 370 | 631 | 261 | 85.0 | 517 | 13.7 | 775 | 258 | 71.2 |
| Ex. 7 | 386 | 635 | 249 | 85.4 | 520 | 7.0 | 851 | 331 | 78.3 |

TABLE 7-continued

|  | | | | | | | | |
|---|---|---|---|---|---|---|---|---|
| Ex. 8 | 385 | 633 | 248 | 86.6 | 520 | 9.1 | 816 | 296 | 77.5 |
| Ex. 9 | 387 | 633 | 246 | 84.5 | 522 | 6.9 | 826 | 304 | 77.6 |
| Ex. 10 | 389 | 629 | 240 | 85.1 | 514 | 9.4 | 813 | 299 | 75.7 |

[*1]Value obtained by subtracting minimum wavelength from maximum wavelength
[*2]$\lambda_{UV}$ = UV cut-off wavelength
[*3]$\lambda_{IR}$ = IR cut-off wavelength
[*4]T = Transmittance
[*5]$\lambda$ = Wavelength

TABLE 8

|  | Calculated thickness (μm) | Wavelength range in which transmittance is 70% or more | | | Wavelength range in which transmittance is 80% or more | | | Wavelength range in which transmittance is 20% or less within wavelength range from 700 to 1200 nm | | |
|---|---|---|---|---|---|---|---|---|---|---|
|  |  | Minimum wave-length (nm) | Maximum wave-length (nm) | Range[*1] (nm) | Minimum wave-length (nm) | Maximum wave-length (nm) | Range[*1] (nm) | Minimum wave-length (nm) | Maximum wave-length (nm) | Range[*1] (nm) |
| Ex. 11 | 131 | 400 | 594 | 194 | 431 | 568 | 137 | 700 | 893 | 193 |
| Ex. 12 | 132 | 412 | 597 | 185 | 460 | 569 | 109 | 700 | 899 | 199 |
| Ex. 13 | 144 | 413 | 597 | 184 | 461 | 567 | 106 | 700 | 906 | 206 |
| Ex. 14 | 173 | 416 | 587 | 171 | 477 | 551 | 74 | 700 | 962 | 262 |
| Ex. 15 | 157 | 401 | 598 | 197 | 433 | 570 | 137 | 700 | 1001 | 301 |
| Ex. 16 | 154 | 402 | 600 | 198 | 436 | 574 | 138 | 700 | 949 | 249 |
| Ex. 17 | 167 | 400 | 600 | 200 | 427 | 574 | 147 | 700 | 962 | 262 |
| Ex. 18 | 131 | 393 | 603 | 210 | 441 | 579 | 138 | 700 | 890 | 190 |
| Ex. 19 | 187 | 390 | 602 | 212 | 427 | 577 | 150 | 700 | 911 | 211 |
| Ex. 20 | 70 | 414 | 597 | 183 | 458 | 568 | 110 | 700 | 1003 | 303 |
| Ex. 21 | 161 | 410 | 597 | 187 | 443 | 570 | 127 | 700 | 1005 | 305 |
| Ex. 22 | 166 | 425 | 591 | 166 | 487 | 555 | 68 | 700 | 1054 | 354 |
| Ex. 23 | 180 | 423 | 583 | 160 | — | — | — | 700 | 1064 | 364 |

|  | $\lambda_{UV}$[*2] (nm) | $\lambda_{IR}$[*3] (nm) | $\lambda_{IR}$-$\lambda_{UV}$ (nm) | Maximum transmittance | | Minimum transmittance in wavelength range from 700 to 1200 nm | | $\lambda$min-$\lambda$max (nm) | Tmax-Tmin (%) |
|---|---|---|---|---|---|---|---|---|---|
|  |  |  |  | T[*4]max (%) | $\lambda$[*5]max (nm) | T[*4]min (%) | $\lambda$[*5]min (nm) |  |  |
| Ex. 11 | 379 | 630 | 251 | 86.1 | 520 | 12.5 | 781 | 261 | 73.6 |
| Ex. 12 | 384 | 633 | 249 | 84.4 | 525 | 11.4 | 782 | 257 | 73.0 |
| Ex. 13 | 385 | 633 | 248 | 84.1 | 520 | 11.3 | 790 | 270 | 72.8 |
| Ex. 14 | 387 | 628 | 241 | 82.1 | 522 | 101.1 | 819 | 297 | 72.0 |
| Ex. 15 | 383 | 634 | 251 | 85.6 | 520 | 7.6 | 852 | 332 | 78.0 |
| Ex. 16 | 382 | 635 | 253 | 86.7 | 526 | 9.4 | 811 | 285 | 77.3 |
| Ex. 17 | 382 | 635 | 253 | 87.0 | 523 | 8.9 | 812 | 289 | 78.1 |
| Ex. 18 | 369 | 637 | 268 | 86.1 | 524 | 11.1 | 783 | 259 | 75.0 |
| Ex. 19 | 371 | 636 | 265 | 86.3 | 521 | 10.4 | 787 | 266 | 75.9 |
| Ex. 20 | 391 | 634 | 243 | 84.3 | 521 | 7.2 | 857 | 336 | 77.1 |
| Ex. 21 | 390 | 633 | 243 | 85.8 | 521 | 7.7 | 851 | 330 | 78.1 |
| Ex. 22 | 392 | 631 | 239 | 82.1 | 526 | 6.7 | 830 | 304 | 75.4 |
| Ex. 23 | 390 | 627 | 237 | 79.6 | 512 | 7.3 | 852 | 340 | 72.3 |

[*1]Value obtained by subtracting minimum wavelength from maximum wavelength
[*2]$\lambda_{UV}$ = UV cut-off wavelength
[*3]$\lambda_{IR}$ = IR cut-off wavelength
[*4]T = Transmittance
[*5]$\lambda$ = Wavelength

TABLE 9

| | Calculated thickness (μm) | Wavelength range in which transmittance is 70% or more | | | Wavelength range in which transmittance is 80% or more | | | Wavelength range in which transmittance is 20% or less within wavelength range from 700 to 1200 nm | | |
|---|---|---|---|---|---|---|---|---|---|---|
| | | Minimum wavelength (nm) | Maximum wavelength (nm) | Range*1 (nm) | Minimum wavelength (nm) | Maximum wavelength (nm) | Range*1 (nm) | Minimum wavelength (nm) | Maximum wavelength (nm) | Range*1 (nm) |
| Ex. 24 | 161 | 402 | 607 | 205 | 428 | 582 | 154 | 700 | 930 | 230 |
| Ex. 25 | 206 | 416 | 606 | 190 | 459 | 578 | 119 | 700 | 953 | 253 |
| Ex. 26 | 177 | 411 | 607 | 196 | 444 | 581 | 137 | 700 | 953 | 253 |
| Ex. 27 | 72 | 390 | 606 | 216 | 430 | 579 | 149 | 700 | 897 | 197 |
| Ex. 28 | 100 | 399 | 600 | 201 | 459 | 568 | 109 | 700 | 885 | 185 |
| Ex. 29 | 142 | 399 | 599 | 200 | 456 | 568 | 112 | 700 | 885 | 185 |
| Ex. 30 | 139 | 409 | 611 | 202 | 441 | 585 | 144 | 700 | 951 | 251 |
| Ex. 31 | 170 | 405 | 607 | 202 | 434 | 581 | 147 | 700 | 938 | 238 |
| Ex. 32 | 166 | 406 | 610 | 204 | 434 | 585 | 151 | 700 | 947 | 247 |
| Ex. 33 | 193 | 411 | 603 | 192 | 452 | 573 | 121 | 700 | 948 | 248 |
| Ex. 34 | 104 | 409 | 607 | 198 | 447 | 574 | 127 | 700 | 985 | 285 |
| Ex. 35 | 97 | 403 | 612 | 209 | 419 | 587 | 168 | 700 | 998 | 298 |
| Ex. 36 | 149 | 403 | 602 | 199 | 438 | 577 | 139 | 700 | 908 | 208 |
| Ex. 37 | 152 | 401 | 603 | 202 | 428 | 578 | 150 | 700 | 913 | 213 |

| | $\lambda_{UV}$*2 (nm) | $\lambda_{IR}$*3 (nm) | $\lambda_{IR}-\lambda_{UV}$ (nm) | Maximum transmittance | | Minimum transmittance in wavelength range from 700 to 1200 nm | | λmin-λmax (nm) | Tmax-Tmin (%) |
|---|---|---|---|---|---|---|---|---|---|
| | | | | T*4max (%) | λ*5max (nm) | T*4min (%) | λ*5min (nm) | | |
| Ex. 24 | 385 | 641 | 256 | 86.9 | 529 | 9.3 | 801 | 272 | 77.6 |
| Ex. 25 | 392 | 641 | 249 | 85.2 | 530 | 8.3 | 813 | 283 | 76.8 |
| Ex. 26 | 391 | 643 | 252 | 85.8 | 520 | 8.0 | 816 | 296 | 77.8 |
| Ex. 27 | 370 | 640 | 270 | 85.0 | 535 | 10.5 | 788 | 253 | 74.5 |
| Ex. 28 | 369 | 636 | 267 | 83.4 | 526 | 11.5 | 782 | 256 | 71.9 |
| Ex. 29 | 370 | 636 | 266 | 83.6 | 526 | 11.5 | 783 | 257 | 72.1 |
| Ex. 30 | 390 | 645 | 255 | 86.0 | 524 | 7.5 | 852 | 328 | 78.5 |
| Ex. 31 | 387 | 642 | 255 | 86.0 | 520 | 8.9 | 802 | 282 | 77.2 |
| Ex. 32 | 389 | 644 | 255 | 86.6 | 522 | 7.9 | 814 | 292 | 78.7 |
| Ex. 33 | 390 | 639 | 249 | 84.7 | 519 | 8.9 | 812 | 293 | 75.9 |
| Ex. 34 | 391 | 644 | 253 | 83.9 | 520 | 8.0 | 828 | 308 | 75.9 |
| Ex. 35 | 390 | 646 | 256 | 88.4 | 521 | 5.8 | 840 | 319 | 82.5 |
| Ex. 36 | 382 | 637 | 255 | 86.2 | 525 | 10.9 | 787 | 262 | 75.3 |
| Ex. 37 | 383 | 637 | 254 | 87.2 | 520 | 10.6 | 797 | 277 | 76.6 |

*1 Value obtained by subtracting minimum wavelength from maximum wavelength
*2 $\lambda_{UV}$ = UV cut-off wavelength
*3 $\lambda_{IR}$ = IR cut-off wavelength
*4 T = Transmittance
*5 λ = Wavelength

TABLE 10

| | Calculated thickness (μm) | Wavelength range in which transmittance is 70% or more | | | Wavelength range in which transmittance is 80% or more | | | Wavelength range in which transmittance is 20% or less within wavelength range from 700 to 1200 nm | | |
|---|---|---|---|---|---|---|---|---|---|---|
| | | Minimum wavelength (nm) | Maximum wavelength (nm) | Range*1 (nm) | Minimum wavelength (nm) | Maximum wavelength (nm) | Range*1 (nm) | Minimum wavelength (nm) | Maximum wavelength (nm) | Range*1 (nm) |
| Ex. 38 | 121 | 406 | 606 | 200 | 454 | 578 | 124 | 700 | 911 | 211 |
| Ex. 39 | 130 | 403 | 605 | 202 | 442 | 578 | 136 | 700 | 906 | 206 |

TABLE 10-continued

| | | | | | | | | | | |
|---|---|---|---|---|---|---|---|---|---|---|
| Ex. 40 | 177 | 415 | 601 | 186 | 471 | 569 | 98 | 700 | 938 | 238 |
| Ex. 41 | 148 | 406 | 611 | 205 | 431 | 586 | 155 | 700 | 953 | 253 |
| Ex. 42 | 154 | 405 | 609 | 204 | 435 | 585 | 150 | 700 | 939 | 239 |
| Ex. 43 | 157 | 401 | 611 | 210 | 420 | 588 | 168 | 700 | 938 | 238 |
| Ex. 44 | 181 | 376 | 610 | 234 | 394 | 589 | 195 | 700 | 881 | 181 |
| Ex. 45 | 259 | 375 | 613 | 238 | 386 | 593 | 207 | 700 | 886 | 186 |
| Ex. 46 | 157 | 421 | 611 | 190 | 465 | 583 | 118 | 700 | 964 | 264 |
| Ex. 47 | 152 | 415 | 612 | 197 | 443 | 586 | 143 | 700 | 961 | 261 |
| Ex. 48 | 159 | 429 | 600 | 171 | 511 | 558 | 47 | 700 | 941 | 241 |
| Ex. 49 | 182 | 424 | 597 | 173 | 503 | 553 | 50 | 700 | 949 | 249 |

| | $\lambda_{UV}$*2 (nm) | $\lambda_{IR}$*3 (%) | $\lambda_{IR}$-$\lambda_{UV}$ (nm) | Maximum transmittance T*4max (%) | $\lambda$*5max (nm) | Minimum transmittance in wavelength range from 700 to 1200 nm T*4min (%) | $\lambda$*5min (nm) | $\lambda$min-$\lambda$max (nm) | Tmax-Tmin (%) |
|---|---|---|---|---|---|---|---|---|---|
| Ex. 38 | 383 | 640 | 257 | 84.3 | 538 | 10.0 | 794 | 256 | 74.3 |
| Ex. 39 | 382 | 639 | 257 | 85.4 | 525 | 10.3 | 793 | 268 | 75.1 |
| Ex. 40 | 389 | 639 | 250 | 83.4 | 524 | 9.2 | 808 | 284 | 74.2 |
| Ex. 41 | 390 | 645 | 255 | 87.0 | 525 | 7.6 | 815 | 290 | 79.4 |
| Ex. 42 | 387 | 643 | 256 | 86.8 | 529 | 8.5 | 815 | 286 | 78.3 |
| Ex. 43 | 386 | 644 | 258 | 87.9 | 526 | 8.2 | 809 | 283 | 79.7 |
| Ex. 44 | 356 | 641 | 285 | 88.1 | 532 | 10.7 | 785 | 253 | 77.4 |
| Ex. 45 | 358 | 643 | 285 | 90.3 | 528 | 10.3 | 779 | 251 | 80.0 |
| Ex. 46 | 399 | 645 | 246 | 84.8 | 534 | 7.1 | 825 | 291 | 77.7 |
| Ex. 47 | 397 | 646 | 249 | 86.3 | 531 | 7.1 | 824 | 293 | 79.2 |
| Ex. 48 | 392 | 638 | 246 | 81.1 | 539 | 9.0 | 809 | 270 | 72.1 |
| Ex. 49 | 392 | 637 | 245 | 81.0 | 535 | 9.0 | 815 | 280 | 72.0 |

*1 Value obtained by subtracting minimum wavelength from maximum wavelength
*2 $\lambda_{UV}$ = UV cut-off wavelength
*3 $\lambda_{IR}$ = IR cut-off wavelength
*4 T = Transmittance
*5 $\lambda$ = Wavelength

TABLE 11

| | Calculated thickness (μm) | Wavelength range in which transmittance is 70% or more | | | Wavelength range in which transmittance is 80% or more | | | Wavelength range in which transmittance is 20% or less within wavelength range from 700 to 1200 nm | | |
|---|---|---|---|---|---|---|---|---|---|---|
| | | Minimum wavelength (nm) | Maximum wavelength (nm) | Range*1 (nm) | Minimum wavelength (nm) | Maximum wavelength (nm) | Range*1 (nm) | Minimum wavelength (nm) | Maximum wavelength (nm) | Range*1 (nm) |
| Ex. 50 | 220 | 408 | 588 | 180 | 447 | 557 | 110 | 700 | 957 | 257 |
| Ex. 51 | 342 | 411 | 582 | 171 | 453 | 548 | 95 | 700 | 988 | 288 |
| Ex. 52 | 311 | 425 | 581 | 156 | 485 | 542 | 57 | 700 | 1024 | 324 |
| Ex. 53 | 241 | 428 | 575 | 147 | — | — | — | 700 | 975 | 275 |
| Ex. 54 | 150 | 406 | 588 | 182 | 441 | 558 | 117 | 700 | 958 | 258 |
| Ex. 55 | 345 | 409 | 587 | 178 | 443 | 559 | 116 | 700 | 1036 | 336 |
| Ex. 56 | 305 | 408 | 587 | 179 | 436 | 562 | 126 | 700 | 928 | 228 |
| Ex. 57 | 295 | 453 | 556 | 103 | — | — | — | 700 | 1174 | 474 |
| Ex. 58 | 215 | 400 | 592 | 192 | 427 | 564 | 137 | 700 | 922 | 222 |
| Ex. 59 | 231 | 402 | 586 | 184 | 438 | 553 | 115 | 700 | 971 | 271 |
| Ex. 60 | 237 | 412 | 589 | 177 | 459 | 556 | 97 | 700 | 954 | 254 |
| Ex. 61 | 218 | 415 | 586 | 171 | 475 | 547 | 72 | 700 | 961 | 261 |
| Ex. 62 | 222 | 395 | 597 | 202 | 418 | 571 | 153 | 700 | 917 | 217 |
| Ex. 63 | 249 | 397 | 595 | 198 | 420 | 570 | 150 | 700 | 936 | 236 |

TABLE 11-continued

|  | $\lambda_{IR}$-$\lambda_{UV}$ [*2] (nm) | $\lambda_{IR}$ [*3] (%) | $\lambda_{UV}$ (nm) | Maximum transmittance | | Minimum transmittance in wavelength range from 700 to 1200 nm | | $\lambda$min-$\lambda$max (nm) | Tmax-Tmin (%) |
|---|---|---|---|---|---|---|---|---|---|
|  |  |  |  | T[*4]max (%) | $\lambda$[*5]max (nm) | T[*4]min (%) | $\lambda$[*5]min (nm) |  |  |
| Ex. 50 | 384 | 628 | 244 | 84.5 | 513 | 10.7 | 813 | 300 | 73.8 |
| Ex. 51 | 386 | 624 | 238 | 83.6 | 510 | 10.2 | 822 | 312 | 73.4 |
| Ex. 52 | 391 | 623 | 232 | 81.6 | 510 | 8.8 | 853 | 343 | 72.8 |
| Ex. 53 | 391 | 621 | 230 | 79.8 | 510 | 10.9 | 813 | 303 | 68.9 |
| Ex. 54 | 384 | 627 | 243 | 85.2 | 512 | 10.8 | 805 | 293 | 74.4 |
| Ex. 55 | 386 | 626 | 240 | 85.7 | 510 | 8.1 | 852 | 342 | 77.6 |
| Ex. 56 | 387 | 625 | 238 | 87.5 | 505 | 12.5 | 794 | 289 | 75.0 |
| Ex. 57 | 394 | 613 | 219 | 75.3 | 519 | 4.7 | 863 | 344 | 70.6 |
| Ex. 58 | 380 | 630 | 250 | 87.2 | 505 | 11.5 | 794 | 289 | 75.6 |
| Ex. 59 | 379 | 628 | 249 | 84.9 | 505 | 9.8 | 812 | 307 | 75.1 |
| Ex. 60 | 385 | 628 | 243 | 83.7 | 517 | 10.7 | 810 | 293 | 73.0 |
| Ex. 61 | 385 | 628 | 243 | 82.0 | 509 | 10.5 | 818 | 309 | 71.5 |
| Ex. 62 | 377 | 633 | 256 | 87.7 | 511 | 11.3 | 794 | 283 | 76.4 |
| Ex. 63 | 379 | 632 | 253 | 88.3 | 506 | 10.9 | 798 | 292 | 77.4 |

[*1] Value obtained by subtracting minimum wavelength from maximum wavelength

[*2] $\lambda_{UV}$ = UV cut-off wavelength

[*3] $\lambda_{IR}$ = IR cut-off wavelength

[*4] T = Transmittance

[*5] $\lambda$ = Wavelength

TABLE 12

|  | Calculated thickness (μm) | Wavelength range in which transmittance is 70% or more | | | Wavelength range in which transmittance is 80% or more | | | Wavelength range in which transmittance is 20% or less within wavelength range from 700 to 1200 nm | | |
|---|---|---|---|---|---|---|---|---|---|---|
|  |  | Minimum wavelength (nm) | Maximum wavelength (nm) | Range[*1] (nm) | Minimum wavelength (nm) | Maximum wavelength (nm) | Range[*1] (nm) | Minimum wavelength (nm) | Maximum wavelength (nm) | Range[*1] (nm) |
| Comp. Ex. 1 | 85 | — | — | — | — | — | — | 300 | 1198 | 898 |
| Comp. Ex. 2 | 169 | 505 | 568 | 63 | — | — | — | 700 | 1091 | 391 |
| Comp. Ex. 3 | 171 | — | — | — | — | — | — | 700 | 975 | 275 |
| Comp. Ex. 4 | 171 | — | — | — | — | — | — | 700 | 1095 | 395 |
| Comp. Ex. 6 | 161 | — | — | — | — | — | — | 300 | 1196 | 896 |
| Comp. Ex. 7 | 170 | — | — | — | — | — | — | 700 | 976 | 276 |
| Comp. Ex. 8 | 169 | — | — | — | — | — | — | 700 | 953 | 253 |
| Comp. Ex. 9 | 188 | — | — | — | — | — | — | 300 | 1158 | 858 |
| Comp. Ex. 11 | 351 | — | — | — | — | — | — | 700 | 1025 | 325 |

TABLE 12-continued

| | $\lambda_{UV}$*2 (nm) | $\lambda_{IR}$*3 (%) | $\lambda_{IR}-\lambda_{UV}$ (nm) | Maximum transmittance T*4max (%) | Maximum transmittance $\lambda$*5max (nm) | Minimum transmittance in wavelength range from 700 to 1200 nm T*4min (%) | Minimum transmittance in wavelength range from 700 to 1200 nm $\lambda$*5min (nm) | $\lambda$min-$\lambda$max (nm) | Tmax-Tmin (%) |
|---|---|---|---|---|---|---|---|---|---|
| Comp. Ex. 1 | — | — | — | 17.0 | 545 | 9.7 | 860 | 315 | 7.3 |
| Comp. Ex. 2 | 415 | 626 | 211 | 72.3 | 539 | 5.8 | 853 | 314 | 66.5 |
| Comp. Ex. 3 | 423 | 622 | 199 | 68.8 | 543 | 9.4 | 823 | 280 | 59.3 |
| Comp. Ex. 4 | 470 | 601 | 131 | 57.6 | 547 | 7.1 | 851 | 304 | 50.5 |
| Comp. Ex. 6 | — | — | — | 6.5 | 565 | 4.0 | 865 | 300 | 2.6 |
| Comp. Ex. 7 | 436 | 633 | 197 | 67.8 | 557 | 7.6 | 823 | 266 | 60.2 |
| Comp. Ex. 8 | 495 | 617 | 122 | 56.7 | 568 | 9.4 | 817 | 249 | 47.3 |
| Comp. Ex. 9 | — | — | — | 19.7 | 574 | 11.0 | 851 | 277 | 8.6 |
| Comp. Ex. 11 | 456 | 596 | 140 | 58.4 | 535 | 9.9 | 851 | 316 | 48.5 |

*1Value obtained by subtracting minimum wavelength from maximum wavelength
*2$\lambda_{UV}$ = UV cut-off wavelength
*3$\lambda_{IR}$ = IR cut-off wavelength
*4T = Transmittance
*5$\lambda$ = Wavelength

The invention claimed is:

1. A light-absorbing composition comprising:
a light absorber including a phosphonic acid represented by the following formula (a) and copper ion;
a hydrolysis-polycondensation product of an alkoxysilane monomer for dispersing the light absorber; and
a silicone resin,
wherein the light absorbing composition does not contain a phosphoric acid ester having a polyoxyalkyl group,
wherein a molar ratio of a content of the alkoxysilane monomer to a content of the copper ion is 2.0 or more
wherein the alkoxysilane includes at least two selected from the group consisting of a tetrafunctional alkoxysilane, a trifunctional alkoxysilane, and a bifunctional alkoxysilane, and a molar ratio of total amount of the trifunctional alkoxysilane and the bifunctional alkoxysilane to the copper ion is 1.839 to 17.652; and
wherein a light-absorbing film formed from the light-absorbing composition having a wavelength band of 100 nm or more, the wavelength band being a range of wavelengths with a normalized transmittance of 70% or more in a normalized transmittance spectrum, and
the normalized transmittance spectrum is obtained by normalizing a transmittance spectrum such that the spectral transmittance at a wavelength of 700 nm is 20%, the transmittance spectrum is a spectrum for light with wavelengths from 300 nm to 1200 nm incident perpendicularly to the light-absorbing film:

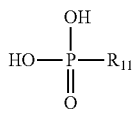
(a)

wherein $R_{11}$ is an alkyl group, an aryl group, a nitroaryl group, a hydroxyaryl group, or a halogenated aryl group in which at least one hydrogen atom in an aryl group is substituted by a halogen atom.

2. The light-absorbing composition according to claim 1, wherein the alkoxysilane monomer comprises the alkyl group-containing the alkoxysilane monomer represented by the following formula (b):

$$(R_2)_n\text{—Si—}(OR_3)_{4-n} \quad (b)$$

wherein $R_2$ is an alkyl group having 1 to 4 carbon atoms, $R_3$ is an alkyl group having 1 to 8 carbon atoms, and n is an integer of 1 to 3.

3. The light-absorbing composition according to claim 2, wherein the phosphonic acid comprises a phosphonic acid represented by the formula (a), wherein $R_{11}$ is an aryl group, a nitroaryl group, a hydroxyaryl group, or a halogenated aryl group in which at least one hydrogen atom in an aryl group is substituted by a halogen atom,
the alkoxysilane monomer comprises the alkyl group-containing the alkoxysilane monomer represented by the formula (b) where n=1 or 2 and a tetrafunctional alkoxysilane monomer represented by the formula (c), and
a molar ratio of a content of the alkyl group-containing alkoxysilane monomer represented by the formula (b) where n=1 or 2 to a content of the copper ion is 2.5 or more, $$\text{Si—}(OR_4)_4 \quad (c)$$

wherein $R_4$ is an alkyl group having 1 to 8 carbon atoms.

4. An optical filter comprising a light absorbing layer, the light absorbing layer including:
a light absorber including a phosphonic acid represented by the following formula (a);

a copper ion;
a hydrolysis-polycondensation product of an alkoxysilane monomer, and
a silicone resin,
wherein the light absorbing layer does not contain a phosphoric acid ester having a polyoxyalkyl group,
wherein a molar ratio of a content of the alkoxysilane monomer to a content of the copper ion is 2.0 or more,
wherein the alkoxysilane includes at least two selected from the group consisting of a tetrafunctional alkoxysilane, a trifunctional alkoxysilane, and a bifunctional alkoxysilane, and a molar ratio of total amount of the trifunctional alkoxysilane and the bifunctional alkoxysilane to the copper ion is 1.839 to 17.652;
the optical filter has a first wavelength band of 100 nm or more, the first wavelength band being a range of wavelengths with a normalized transmittance of 70% or more in a normalized transmittance spectrum, and
the normalized transmittance spectrum is obtained by normalizing a transmittance spectrum such that the spectral transmittance at a wavelength of 700 nm is 20%, the transmittance spectrum is a spectrum for light with wavelengths from 300 nm to 1200 nm incident perpendicularly to the optical filter:

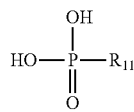
(a)

wherein $R_{11}$ is an alkyl group, an aryl group, a nitroaryl group, a hydroxyaryl group, or a halogenated aryl group in which at least one hydrogen atom in an aryl group is substituted by a halogen atom.

5. The optical filter according to claim 4, the optical filter further having a second wavelength band of 40 nm or more, the second wavelength band being a range of wavelengths with a transmittance of 80% or more in the normalized transmittance spectrum.

6. The optical filter according to claim 4, the optical filter further having a third wavelength band of 120 nm or more, the third wavelength band being a range of wavelengths with a transmittance of 20% or less in a range of wavelength of 700 nm to 1200 nm in the normalized transmittance spectrum.

7. The optical filter according to claim 4, the optical filter, in the normalized transmittance spectrum, further having:
a fourth wavelength band in which the transmittance decreases with an increase in wavelength;
a fifth wavelength band in which the transmittance increases with an increase in wavelength, the fifth wavelength band including a wavelength shorter than a minimum wavelength in the fourth wavelength band;
a first cut-off wavelength with the transmittance of 50% in the fourth wavelength band; and
a second cut-off wavelength with the transmittance of 50% in the fifth wavelength band,
wherein a difference obtained by subtracting the second cut-off wavelength from the first cut-off wavelength is 200 nm to 290 nm.

8. The optical filter according to claim 4, the optical filter, in the normalized transmittance spectrum, further having:
a first wavelength with a maximum transmittance in a range of wavelength of 500 nm to 550 nm; and
a second wavelength with a minimum transmittance in a range of wavelength of 700 nm to 1200 nm,
wherein a difference obtained by subtracting the first wavelength from the second wavelength is from 240 nm to 360 nm.

9. The optical filter according to claim 4, wherein, in the normalized transmittance spectrum, a difference obtained by subtracting a minimum transmittance in a range of wavelength of 700 nm to 1200 nm from a maximum transmittance is more than 68%.

10. The optical filter according to claim 4, the silicone resin having an aryl group.

\* \* \* \* \*